United States Patent
Jiang et al.

(10) Patent No.: US 12,301,296 B2
(45) Date of Patent: May 13, 2025

(54) PHASE CALIBRATION METHOD AND APPARATUS FOR PHASED ARRAY ANTENNA

(71) Applicants: Research Institute of Millimeter Wave and Terahertz Technology, Nanjing (CN); BOE Technology Group Co., Ltd., Beijing (CN); Beijing BOE Sensor Technology Co., Ltd., Beijing (CN)

(72) Inventors: Zhihao Jiang, Beijing (CN); Fengshuo Wan, Beijing (CN); Chong Guo, Beijing (CN); Xueyan Su, Beijing (CN); Xinyu Wu, Beijing (CN); Hongyuan Feng, Beijing (CN); Meng Wei, Beijing (CN); Longzhu Cai, Beijing (CN); Chuncheng Che, Beijing (CN); Wei Hong, Beijing (CN)

(73) Assignees: Research Institute of Millimeter Wave and Terahertz Technology, Nanjing (CN); BOE Technology Group Co., Ltd., Beijing (CN); Beijing BOE Sensor Technology Co., Ltd., Beijing (CN)

(*) Notice: Subject to any disclaimer, the term of this patent is extended or adjusted under 35 U.S.C. 154(b) by 0 days.

(21) Appl. No.: 18/032,373

(22) PCT Filed: Apr. 25, 2022

(86) PCT No.: PCT/CN2022/089066
§ 371 (c)(1),
(2) Date: Apr. 18, 2023

(87) PCT Pub. No.: WO2023/206019
PCT Pub. Date: Nov. 2, 2023

(65) Prior Publication Data
US 2024/0396642 A1 Nov. 28, 2024

(51) Int. Cl.
H04B 17/12 (2015.01)

(52) U.S. Cl.
CPC .................................. H04B 17/12 (2015.01)

(58) Field of Classification Search
CPC ........... H04B 17/12; H01Q 3/26; H01Q 21/00
(Continued)

(56) References Cited

U.S. PATENT DOCUMENTS

| 2017/0222735 | A1* | 8/2017 | Kawamura | ........ H04B 17/0085 |
| 2024/0243818 | A1* | 7/2024 | Shen | ..................... H04B 17/13 |

* cited by examiner

Primary Examiner — Don N Vo
(74) Attorney, Agent, or Firm — HOUTTEMAN LAW LLC

(57) ABSTRACT

A phase calibration method for a phased array antenna is provided. The method includes: sequentially calibrating M×N antenna units based on a pre-obtained test voltage set including first test voltages; sequentially loading the first test voltages to the antenna unit in the ith row and the jth column, and acquiring phase and amplitude information of a microwave signal radiated by the antenna unit every time one first test voltage is loaded; acquiring first array vectors through analysis based on the phase and amplitude information of the acquired microwave signals of the antenna unit under different first test voltages; obtaining a calibration response vector of the antenna unit under each first test voltage in the test voltage set through a first preset algorithm based on the first array vector, and determining a target voltage-phase curve corresponding to the antenna unit in the ith row and the jth column.

20 Claims, 10 Drawing Sheets

(58) Field of Classification Search
USPC .......................................................... 455/103
See application file for complete search history.

PHASE CALIBRATION METHOD AND APPARATUS FOR PHASED ARRAY ANTENNA

TECHNICAL FIELD

The present disclosure relates to the field of antenna technology, and in particular to a phase calibration method for a phased array antenna and a phase calibration apparatus for a phased array antenna.

BACKGROUND

A phased array antenna typically enables beams to be reconfigurable based on a voltage-phase curve of radiation units. There is a machining error when manufacturing the radiation units, so that it is difficult to ensure the consistency of radiation units in the phased array antenna. For example, initial phases and phase shift ranges of the radiation units are greatly different from each other, that is, the voltage-phase curves of the radiation units are different from each other. If the phased array antenna performs a disposing-phase process according to the voltage-phase curve with errors in the radiation units, an error in the disposing-phase may be caused, so that the beam pointing cannot be scanned as expected, for example, resulting in the beam deformation, a reduced gain, or even the un-reconfigurable beam or the like.

SUMMARY

The present disclosure is directed to solve at least one of the technical problems in the prior art, and provides a phase calibration method for a phased array antenna and a phase calibration apparatus for a phased array antenna, which can directly measure and calibrate a phase of an antenna unit, and obtain a more accurate target voltage-phase curve of the antenna unit without relying on any prior condition, such as unknown phase shift amount and unknown phase shift range of the antenna unit. A test voltage set is determined by screening a control voltage, which can improve the efficiency of measurement and calibration for a nonlinear voltage-phase curve.

In a first aspect, a technical solution adopted to solve the technical problem of the present disclosure is a phase calibration method for a phased array antenna, wherein the phased array antenna includes M×N antenna units arranged in an array, where one of M and N is a positive integer which is greater than or equal to 1, and the other one is a positive integer which is greater than or equal to 2; the phase calibration method includes: sequentially calibrating the M×N antenna units based on a pre-obtained test voltage set; wherein the test voltage set includes a plurality of first test voltages; wherein the step of calibrating an antenna unit in an ith row and a jth column includes: sequentially loading the plurality of first test voltages to the antenna unit in the ith row and the jth column, and acquiring phase and amplitude information of a microwave signal radiated by the antenna unit in the ith row and the jth column every time one of the plurality of first test voltages is loaded; where $0<I\leq M$, $0<j\leq N$, and i and j are positive integers; acquiring a plurality of first array vectors through analysis based on the phase and amplitude information of the acquired microwave signals of the antenna unit in the ith row and the jth column under different first test voltages; wherein each first array vector is used for representing a sum of a plurality of response vectors of the M×N antenna units; each response vector is used for representing the phase and amplitude information of the microwave signal radiated by a corresponding antenna unit under a corresponding first test voltage; and obtaining a calibration response vector of the antenna unit in the ith row and the jth column under each first test voltage in the test voltage set through a first preset algorithm based on the first array vector, and determining a target voltage-phase curve corresponding to the antenna unit in the ith row and the jth column; wherein the calibration response vector is used for representing the calibrated phase and amplitude information of the microwave signal radiated by the antenna unit in the ith row and the jth column under the first test voltage.

In some embodiments, the test voltage set is determined by: sequentially loading a plurality of control voltages in a preset control voltage range to a reference antenna unit, and acquiring phase and amplitude information of a microwave signal radiated by the reference antenna unit every time one of the plurality of control voltages is loaded; wherein the reference antenna unit is any one of the M×N antenna units; generating a voltage-phase curve corresponding to the reference antenna unit according to each control voltage and phase information acquired under the control voltage; and screening some control voltages from the preset control voltage range as the first test voltages according to the voltage-phase curve corresponding to the reference antenna unit and a first voltage screening condition, to obtain the test voltage set.

In some embodiments, the voltage-phase curve includes at least a first line segment and a second line segment; a curvature of the first line segment is within a first preset curvature range, and a curvature of the second line segment is within a second preset curvature range; each curvature in the first preset curvature range is greater than that in the second preset curvature range; the screening some control voltages from the preset control voltage range as the first test voltages according to the voltage-phase curve corresponding to the reference antenna unit and a first voltage screening condition, to obtain the test voltage set, includes: acquiring a first control voltage sub-range corresponding to the first line segment, and acquiring a second control voltage sub-range corresponding to the second line segment; and screening a first number of control voltages from the first control voltage sub-range as first test voltages, and screening a second number of control voltages from the second control voltage sub-range as first test voltages, to obtain the test voltage set; wherein the first number is greater than the second number.

In some embodiments, the obtaining a calibration response vector of the antenna unit in the ith row and the jth column under each first test voltage in the test voltage set through a first preset algorithm based on the first array vector, and determining a target voltage-phase curve corresponding to the antenna unit in the ith row and the jth column, includes: for each first test voltage in the test voltage set, removing an environment vector from the first array vector, to obtain the calibration response vector of the antenna unit in the ith row and the jth column under the first test voltage; wherein the environment vector is used for representing a sum of response vectors corresponding to other antenna units except the antenna unit in the ith row and the jth column in the phased array antenna; and determining the target voltage-phase curve corresponding to the antenna unit in the ith row and the jth column based on each first test voltage and the calibrated phase information of the microwave signal radiated by the antenna unit in the ith row and the jth column under each first test voltage.

In some embodiments, the removing an environment vector from each first array vector, to obtain the calibration response vector of the antenna unit in the ith row and the jth column under the first test voltage, includes: when it is determined based on phase information of the microwave signal radiated by the antenna unit in the ith row and the jth column that a phase shift range of the antenna unit in the ith row and the jth column is between 359° and 360°, determining a sum of the first array vectors based on the first array vector of the antenna unit in the ith row and the jth column under each first test voltage; determining the environment vector corresponding to the antenna unit in the ith row and the jth column based on the sum of the first array vectors and the number of the first array vectors; and removing the environment vector from each first array vector, to obtain the calibration response vector of the antenna unit in the ith row and the jth column under the first test voltage.

In some embodiments, the removing an environment vector from each first array vector, to obtain the calibration response vector of the antenna unit in the ith row and the jth column under the first test voltage, includes: screening a plurality of pairs of second array vectors with a phase difference of 180° from the first array vectors of the antenna unit in the ith row and the jth column under all first test voltages based on phase information of the microwave signal radiated by the antenna unit in the ith row and the jth column; determining a sum of the screened second array vectors; determining the environment vector corresponding to the antenna unit in the ith row and the jth column based on the sum of the second array vectors and the number of the second array vectors; and removing the environment vector from each first array vector, to obtain the calibration response vector of the antenna unit in the ith row and the jth column under the first test voltage.

In some embodiments, the removing an environment vector from each first array vector, to obtain the calibration response vector of the antenna unit in the ith row and the jth column under the first test voltage, includes: performing the ellipse fitting on the first array vectors of the antenna unit in the ith row and the jth column under all first test voltages, to obtain the environment vector corresponding to the antenna unit in the ith row and the jth column; and removing the environment vector from each first array vector, to obtain the calibration response vector of the antenna unit in the ith row and the jth column under the first test voltage.

In some embodiments, the calibration response vector includes a horizontal polarization response vector and a vertical polarization response vector; wherein the horizontal polarization response vector is used for representing horizontal polarization phase and amplitude information of the microwave signal radiated by the antenna unit in the ith row and the jth column under the first test voltage; the vertical polarization response vector is used for representing vertical polarization phase and amplitude information of the microwave signal radiated by the antenna unit in the ith row and the jth column under the first test voltage; the determining a target voltage-phase curve corresponding to the antenna unit in the ith row and the jth column, includes: performing polarization synthesis on the horizontal polarization response vector and the vertical polarization response vector, to obtain a target response vector; wherein the target response vector is used for representing target phase and amplitude information of the microwave signal radiated by the antenna unit in the ith row and the jth column under the first test voltage; and determining the target voltage-phase curve corresponding to the antenna unit in the ith row and the jth column based on each first test voltage and target phase information of the microwave signal radiated by the antenna unit in the ith row and the jth column under each first test voltage.

In a second aspect, the present disclosure further provides a phase calibration method for a phased array antenna, wherein the phased array antenna includes M×N antenna units arranged in an array, where one of M and N is a positive integer which is greater than or equal to 1, and the other one is a positive integer which is greater than or equal to 2; the phase calibration method includes: uniformly sampling a plurality of control voltages from a preset control voltage range to form a test voltage set including a plurality of first test voltages; wherein the step of calibrating an antenna unit in an ith row and a jth column includes: sequentially loading the plurality of first test voltages in the test voltage set to the antenna unit in the ith row and the jth column, and acquiring phase and amplitude information of a microwave signal radiated by the antenna unit in the ith row and the jth column every time one of the plurality of first test voltages is loaded; where $0<1 \leq M$, $0<j \leq N$, and i and j are positive integers; acquiring a plurality of first array vectors through analysis based on the phase and amplitude information of the acquired microwave signals of the antenna unit in the ith row and the jth column under different first test voltages; wherein each first array vector is used for representing a sum of a plurality of response vectors of the M×N antenna units in the phased array antenna; each response vector is used for representing the phase and amplitude information of the microwave signal radiated by a corresponding antenna unit under a corresponding first test voltage; removing a first environment vector from each first array vector through a first preset algorithm, to obtain an initial response vector of the antenna unit in the ith row and the jth column under each first test voltage in the test voltage set, and determining an initial voltage-phase curve corresponding to the antenna unit in the ith row and the jth column; wherein the first environment vector is used for representing a sum of response vectors corresponding to other antenna units except the antenna unit in the ith row and the jth column in the phased array antenna; the initial response vector is used for representing initial phase and amplitude information of the microwave signal radiated by the antenna unit in the ith row and the jth column under the first test voltage; updating the test voltage set according to the initial voltage-phase curve corresponding to the antenna unit in the ith row and the jth column and a second voltage screening condition, to obtain the updated test voltage set; and sequentially loading a plurality of second test voltages in the updated test voltage set to the antenna unit in the ith row and the jth column, to obtain a target voltage-phase curve corresponding to the antenna unit in the ith row and the jth column.

In some embodiments, the sequentially loading a plurality of second test voltages in the updated test voltage set to the antenna unit in the ith row and the jth column, to obtain a target voltage-phase curve corresponding to the antenna unit in the ith row and the jth column, includes: sequentially loading the second test voltages in the updated test voltage set to the antenna unit in the ith row and the jth column, and acquiring phase and amplitude information of the microwave signal radiated by the antenna unit in the ith row and the jth column every time one of the second test voltages is loaded; acquiring the plurality of first array vectors through analysis based on the phase and amplitude information of the acquired microwave signals of the antenna unit in the ith row and the jth column under different second test voltages; extracting a second environment vector from each first array vector through the first preset algorithm based on the first array vector; wherein the second environment vector is used for representing a sum of response vectors corresponding to other antenna units except the antenna unit in the ith row and the jth column in the phased array antenna; obtaining a calibration response vector of the antenna unit in the ith row and the jth column under each first test voltage in the test voltage set through the first preset algorithm in a case where an error between the second environment vector and the first environment vector is smaller than a preset value; wherein the calibration response vector is used for representing the calibrated phase and amplitude information of the microwave signal radiated by the antenna unit in the ith row and the jth column under the first test voltage; and determining the target voltage-phase curve corresponding to the antenna unit in the ith row and the jth column based on each second test voltage and calibrated phase information of the microwave signal radiated by the antenna unit in the ith row and the jth column under each second test voltage.

In some embodiments, the phase calibration method for a phased array antenna further includes: continuously updating the test voltage set based on the second environment vector if the error between the second environment vector and the first environment vector is greater than or equal to the preset value, until the error between the second environment vector and the first environment vector is less than the preset value.

In some embodiments, the initial voltage-phase curve includes at least a third line segment; a curvature of the third line segment is within a third preset curvature range; the updating the test voltage set according to the initial voltage-phase curve corresponding to the antenna unit in the ith row and the jth column and a second voltage screening condition, to obtain the updated test voltage set, includes: acquiring a third control voltage sub-range corresponding to the third line segment; and screening a third number of control voltages from the third control voltage sub-range as second test voltages, and updating the test voltage set to obtain the updated test voltage set.

In some embodiments, the removing a first environment vector from each first array vector through a first preset algorithm, to obtain an initial response vector of the antenna unit in the ith row and the jth column under each first test voltage in the test voltage set, includes: determining a sum of first array vectors based on the first array vectors of the antenna unit in the ith row and the jth column under all first test voltages in a case where it is determined based on phase information of the microwave signal radiated by the antenna unit in the ith row and the jth column that a phase shift range of the antenna unit in the ith row and the jth column is between 359° and 360°; determining the first environment vector corresponding to the antenna unit in the ith row and the jth column based on a sum of the first array vectors and the number of the first array vectors; and removing the first environment vector from each first array vector, to obtain the initial response vector of the antenna unit in the ith row and the jth column under each first test voltage.

In some embodiments, the removing a first environment vector from each first array vector through a first preset algorithm, to obtain an initial response vector of the antenna unit in the ith row and the jth column under each first test voltage in the test voltage set, includes: screening a plurality of pairs of second array vectors with a phase difference of 180° therebetween, from the plurality of first array vectors of the antenna unit in the ith row and the jth column under all the first test voltages based on the phase information of the microwave signals radiated by the antenna unit in the ith row and the jth column; determining a sum of the screened second array vectors; determining the first environment vector corresponding to the antenna unit in the ith row and the jth column based on a sum of the second array vectors and the number of the second array vectors; and removing the first environment vector from each first array vector, to obtain the initial response vector of the antenna unit in the ith row and the jth column under each first test voltage.

In some embodiments, the removing a first environment vector from each first array vector through a first preset algorithm, to obtain an initial response vector of the antenna unit in the ith row and the jth column under each first test voltage in the test voltage set, includes: performing an ellipse fitting on the plurality of first array vectors of the antenna unit in the ith row and the jth column under all the first test voltages, to obtain the first environment vector corresponding to the antenna unit in the ith row and the jth column; and removing the first environment vector from each first array vector, to obtain the initial response vector of the antenna unit in the ith row and the jth column under each first test voltage.

In some embodiments, the calibration response vector includes a horizontal polarization response vector and a vertical polarization response vector; the horizontal polarization response vector is used for representing horizontal polarization phase and amplitude information of the microwave signal radiated by the antenna unit in the ith row and the jth column under the second test voltage; the vertical polarization response vector is used for representing vertical polarization phase and amplitude information of the microwave signal radiated by the antenna unit in the ith row and the jth column under the second test voltage; the obtaining a target voltage-phase curve corresponding to the antenna unit in the ith row and the jth column, includes: performing polarization synthesis on the horizontal polarization response vector and the vertical polarization response vector, to obtain a target response vector; wherein the target response vector is used for representing target phase and amplitude information of the microwave signal radiated by the antenna unit in the ith row and the jth column under the second test voltage; and determining the target voltage-phase curve corresponding to the antenna unit in the ith row and the jth column based on each second test voltage and target phase information of the microwave signal radiated by the antenna unit in the ith row and the jth column under each second test voltage.

In a third aspect, the present disclosure further provides a phase calibration apparatus for a phased array antenna, wherein the phase calibration apparatus for a phased array antenna is configured to perform the phase calibration method for a phased array antenna in the first aspect; the phased array antenna includes M×N antenna units arranged in an array, where one of M and N is a positive integer which is greater than or equal to 1, and the other one of M and N is a positive integer which is greater than or equal to 2; the phase calibration apparatus for a phased array antenna is configured to sequentially calibrate the M×N antenna units based on a pre-obtained test voltage set; the test voltage set includes a plurality of first test voltages; the phase calibration apparatus for a phased array antenna includes a detection sensor, a voltage supply apparatus, a vector analyzer and a controller; the voltage supply apparatus is configured to sequentially load the plurality of first test voltages in the test voltage set to the antenna unit in the ith row and the jth column under the control of the controller; where $0<i\leq M$, $0<j\leq N$, and i and j are positive integers; the detection sensor is configured to acquire phase and amplitude information of a microwave signal radiated by the antenna unit in the ith row and the jth column every time one of the plurality of first test voltages is loaded to the antenna unit in the ith row and the jth column by the voltage supply apparatus; and transmit the phase and amplitude information to the vector analyzer; the vector analyzer is configured to acquire a plurality of first array vectors through analysis based on the phase and amplitude information of the acquired microwave signals of the antenna unit in the ith row and the jth column under different first test voltages; and transmit the plurality of first array vectors to the controller; where each first array vector is used for representing a sum of a plurality of response vectors of the M×N antenna units; each response vector is used for representing the phase and amplitude information of the microwave signal radiated by a corresponding antenna unit under a corresponding first test voltage; and the controller is configured to obtain a calibration response vector of the antenna unit in the ith row and the jth column under each first test voltage in the test voltage set through a first preset algorithm based on the plurality of first array vectors, and determine a target voltage-phase curve corresponding to the antenna unit in the ith row and the jth column; where the calibration response vector is used for representing the calibrated phase and amplitude information of the microwave signal radiated by the antenna unit in the ith row and the jth column under the first test voltage.

In some embodiments, a height of the detection sensor is within a height range of each antenna unit in the phased array antenna; a distance from the detection sensor to an orthographic projection of the detection sensor on the phased array antenna is in a range from $0.5\lambda$ to $1\lambda$; where $\lambda$ is a center frequency wavelength.

In a fourth aspect, the present disclosure further provides a phase calibration apparatus for a phased array antenna, wherein the phase calibration apparatus for a phased array antenna is configured to perform the phase calibration method for a phased array antenna in the second aspect; the phased array antenna includes M×N antenna units arranged in an array, where one of M and N is a positive integer which is greater than or equal to 1, and the other one is a positive integer which is greater than or equal to 2; the phase calibration apparatus for a phased array antenna includes a detection sensor, a voltage supply apparatus, a vector analyzer and a controller; the controller is configured to uniformly sample a plurality of control voltages from a preset control voltage range to form the test voltage set; wherein the test voltage set includes the plurality of first test voltages; and obtain an initial response vector of the antenna unit in the ith row and the jth column under each first test voltage in the test voltage set through a first preset algorithm based on the first array vector, and determine an initial voltage-phase curve corresponding to the antenna unit in the ith row and the jth column; wherein the initial response vector is used for representing initial phase and amplitude information of the microwave signal radiated by the antenna unit in the ith row and the jth column under the first test voltage; update the test voltage set according to the initial voltage-phase curve corresponding to the antenna unit in the ith row and the jth column and a second voltage screening condition, to obtain the updated test voltage set; and obtain a target voltage-phase curve corresponding to the antenna unit in the ith row and the jth column through a second preset algorithm; the voltage supply apparatus is configured to sequentially load the plurality of first test voltages in the test voltage set to the antenna unit in the ith row and the jth column under the control of the controller; where $0<i\leq M$, $0<j\leq N$, and i and j are positive integers; and sequentially load second test voltages in the updated test voltage set to the antenna unit in the ith row and the jth column under the control of the controller; the detection sensor is configured to acquire phase and amplitude information of a microwave signal radiated by the antenna unit in the ith row and the jth column every time one of the plurality of first test voltages is loaded to the antenna unit in the ith row and the jth column by the voltage supply apparatus; and transmit the phase and amplitude information to the vector analyzer; and the vector analyzer is configured to acquire a plurality of first array vectors through analysis based on the phase and amplitude information of the acquired microwave signals of the antenna unit in the ith row and the jth column under different first test voltages; where each first array vector is used for representing a sum of a plurality of response vectors of the M×N antenna units; each response vector is used for representing the phase and amplitude information of the microwave signal radiated by a corresponding antenna unit under a corresponding first test voltage.

In a fifth aspect, the present disclosure further provides a phase calibration system for a phased array antenna, wherein the phase calibration system for a phased array antenna includes the phase calibration apparatus for a phased array antenna in the third aspect or the fourth aspect, and the phased array antenna.

DETAIL DESCRIPTION OF EMBODIMENTS

Figure 1:
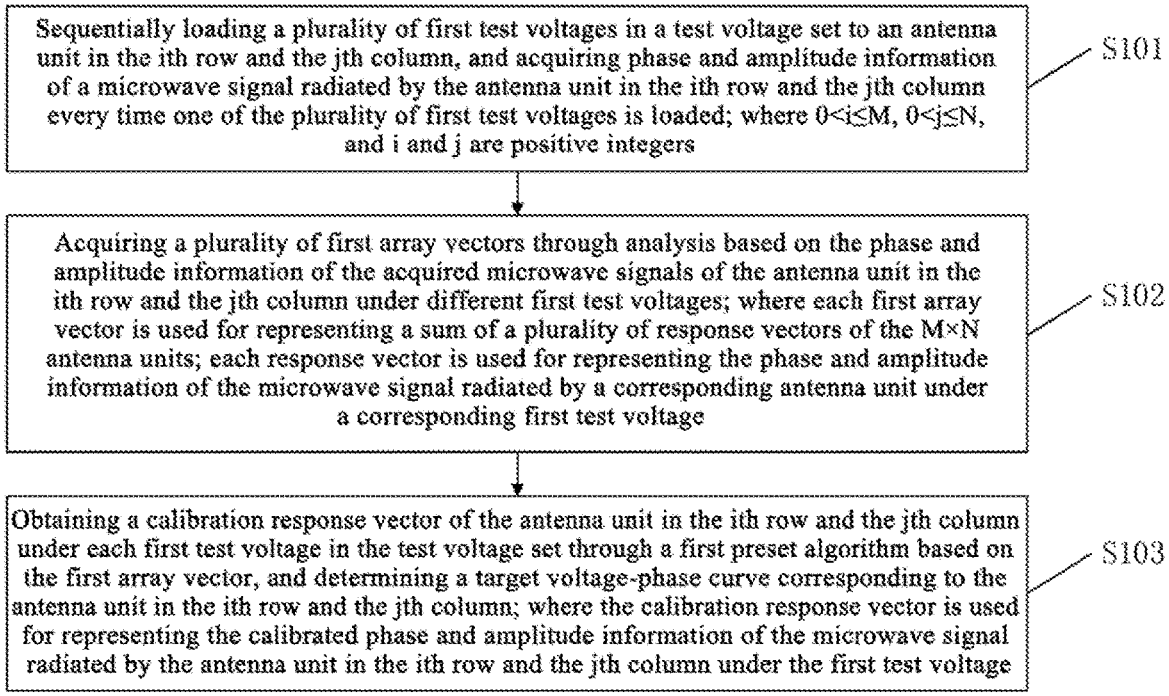
FIG. 1 is a flowchart of a phase calibration method for a phased array antenna according to an embodiment of the present disclosure.

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

It should be noted that a phased array antenna in the embodiment of the present disclosure refers to an antenna in which a feed phase of each radiation unit in antenna units in an array is controlled to be changed by applying control voltages to phase shifters in the antenna units, to change a shape of a pattern. The feed phase of each radiation unit in the antenna units is controlled to be changed, which can change a pointing of a maximum value of a pattern of an antenna to achieve the beam scanning.

It should be noted that a body performing a phase calibration method for a phased array antenna provided by the embodiment of the present disclosure may be a phase calibration apparatus for a phased array antenna, which may include a detection sensor, a voltage supply apparatus, a vector analyzer, and a controller.

The phased array antenna in the embodiment of the present disclosure includes M×N antenna units arranged in an array, wherein one of M and N is a positive integer which is greater than or equal to 1, and the other one is a positive integer which is greater than or equal to 2. For example, the phased array antenna may include, but be not limited to, a liquid crystal phased array antenna. Alternatively, the phased array antenna may also include other types of phased array antennas in other application scenarios, which is not limited in the embodiments of the present disclosure. The method of the embodiment of the present disclosure can be applied for a phase calibration for any polarized liquid crystal phased array antenna. For example, the method can be applied for a phase calibration for each antenna of a linearly polarized, a dual linearly polarized, a circularly polarized or a dual circularly polarized liquid crystal phased array antenna, thereby obtaining a more accurate target voltage-phase curve of each antenna unit.

In the embodiment of the present disclosure, the M×N antenna units are sequentially calibrated based on a pre-obtained test voltage set, where the test voltage set may be determined in different ways, specifically including the following two modes. 1. The test voltage set is formed by screening (or selecting) a fixed number of first test voltages; or 2. a test voltage set is pre-screened, and the test voltage set is adaptively updated as an updated test voltage set.

The calibration for an antenna unit in an ith row and a jth column in the M×N antenna units will be described in detail below by taking an example where the test voltage set is formed by screening a fixed number of first test voltages.

FIG. 1 is a flowchart of a phase calibration method for a phased array antenna according to an embodiment of the present disclosure. The step of calibrating an antenna unit in an ith row and a jth column includes following steps S101 to S103:

S101, sequentially loading a plurality of first test voltages to the antenna unit in the ith row and the jth column, and acquiring phase and amplitude information of a microwave signal radiated by the antenna unit in the ith row and the jth column every time one of the plurality of first test voltages is loaded; where $0<i\leq M$, $0<j\leq N$, and i and j are positive integers.

S102, acquiring a plurality of first array vectors through analysis based on the phase and amplitude information of the acquired microwave signals of the antenna unit in the ith row and the jth column under different first test voltages; where each first array vector is used for representing a sum of a plurality of response vectors of the M×N antenna units; each response vector is used for representing the phase and amplitude information of the microwave signal radiated by a corresponding antenna unit under a corresponding first test voltage.

S103, obtaining a calibration response vector (or a calibrated response vector) of the antenna unit in the ith row and the jth column under each first test voltage in the test voltage set through a first preset algorithm based on the plurality of first array vectors, and determining a target voltage-phase curve corresponding to the antenna unit in the ith row and the jth column; where the calibration response vector is used for representing the calibrated phase and amplitude information of the microwave signal radiated by the antenna unit in the ith row and the jth column under the first test voltage.

According to the embodiment of the present disclosure, the first array vectors are obtained by analyzing the phase and amplitude information of the acquired microwave signals by the antenna unit in the ith row and the jth column under different first test voltages. According to the embodiment of the present disclosure, without relying on any prior condition, such as unknown phase shift amount and unknown phase shift range of the antenna unit, a phase of an antenna unit can be directly measured and calibrated through the first preset algorithm based on the plurality of first array vectors, thereby obtaining the calibration response vector of the antenna unit in the ith row and the jth column under each first test voltage in the test voltage set and determining a more accurate target voltage-phase curve of each antenna unit.

The above steps will be described in detail below in following embodiments.

The test voltage set in the step S101 may be determined by the following steps:

Step 1, sequentially loading a plurality of control voltages in a preset control voltage range to a reference antenna unit, and acquiring phase and amplitude information of a microwave signal radiated by the reference antenna unit every time one of the plurality of control voltages is loaded; where the reference antenna unit is any one of the M×N antenna units.

Here, the reference antenna unit may be a reference of the M×N antenna units. With the reference antenna unit as the reference, the acquired phase and amplitude information of the microwave signal radiated by the reference antenna unit may be used as phase and amplitude information of the microwave signal radiated by each of the M×N antenna units. The preset control voltage range includes control voltages in a continuous range. For example, the preset control voltage range may be set to 0 to 23.5 volts (V).

In specific implementation, the control voltages in the preset control voltage range are sequentially loaded to the phase shifter in the reference antenna unit, and information (that is, the phase and amplitude information of the microwave signal, which is acquired and obtained through analysis at the same time) of the microwave signal radiated by a radiation unit in the reference antenna unit is acquired by a detection sensor every time one of the plurality of control voltages is loaded. The phase and amplitude information includes phase information and amplitude information. The phase information may represent an absolute phase of the microwave signal radiated by the radiation unit, and the amplitude information may represent an amplitude of the microwave signal radiated by the radiation unit.

The detection sensor may include a polarized probe, a dual polarized probe, or the like.

Here, the phase and amplitude information of the microwave signal of the microwave signal radiated by the radiation unit in the reference antenna unit under the control voltage may be acquired by the detection sensor every time one of the plurality of control voltages is loaded to the phase shifter in the reference antenna unit, so that a correspondence between all control voltages and the phase information in the phase and amplitude information acquired under the control voltages can be determined.

Step 2, generating a voltage-phase curve corresponding to the reference antenna unit according to each control voltage and the phase information acquired under the control voltage.

In specific implementation, the voltage-phase curve corresponding to the reference antenna unit is generated according to the correspondence between all the control voltages and the phase information acquired under the control voltages, and the absolute phases represented by the phase information corresponding to the respective control voltages. An abscissa in the voltage-phase curve may represent a continuous control voltage in the preset control voltage range, and an ordinate in the voltage-phase curve may represent an absolute phase corresponding to each control voltage.

It should be noted that a voltage amplitude curve corresponding to the reference antenna unit may be generated based on the amplitude information in the phase and the amplitude information. Since the embodiment of the present disclosure is mainly directed at calibrating the phase of the antenna unit and analyzing the voltage-phase curve, the voltage amplitude curve is not described in detail without analyzing the voltage amplitude curve.

Step 3, screening some control voltages from the preset control voltage range as the first test voltages according to the voltage-phase curve corresponding to the reference antenna unit and a first voltage screening condition, to obtain the test voltage set.

In this step, the first voltage screening condition is preset, and may include, but be not limited to, screening according to a curvature of the voltage-phase curve. The voltage-phase curve includes at least a first line segment and a second line segment; a curvature of the first line segment is within a first preset curvature range, and a curvature of the second line segment is within a second preset curvature range; each curvature in the first preset curvature range is greater than that in the second preset curvature range. The specific screening process includes the following step 3.1 to step 3.2:

Step 3.1, acquiring a first control voltage sub-range corresponding to the first line segment, and acquiring a second control voltage sub-range corresponding to the second line segment.

The first control voltage sub-range corresponding to the first line segment is an abscissa value range (a range of an abscissa value) corresponding to the first line segment in the voltage-phase curve; the second control voltage sub-range corresponding to the second line segment is an abscissa value range corresponding to the second line segment in the voltage-phase curve.

Step 3.2, screening a first number of control voltages from the first control voltage sub-range as first test voltages, and screening a second number of control voltages from the second control voltage sub-range as first test voltages, to obtain the test voltage set; where the first number is greater than the second number.

The test voltage set includes a discrete plurality of first test voltages screened from the preset control voltage range. The test voltage set is represented as $V=(v_1, v_2, \ldots, v_r, \ldots, v_D)$; where $v_1, v_2, \ldots, v_r, \ldots, v_D$ are the first test voltages which are arranged in an order from the minimum value to the maximum value, respectively; D represents the total number (i.e. the preset fixed number) of the screened first test voltages, and D is a positive integer greater than 1. For example, D may represent a sum of the first number and the second number.

Each curvature in the first preset curvature range is larger than that in the second preset curvature range, that is, a variation of the absolute phase indicated by the first line segment with the control voltage is larger than that of the absolute phase indicated by the second line segment with the control voltage.

In step 3.1 to step 3.2 of the screening process, in order to ensure the accuracy of the subsequently determined response vector of the antenna unit, it is necessary to screen a larger number of control voltages from the first control voltage sub-range corresponding to the first line segment with the larger curvature as first test voltages to be subsequently loaded to the antenna unit; to screen a smaller number of control voltages from the second control voltage sub-range corresponding to the second line segment with the smaller curvature as first test voltages to be subsequently loaded to the antenna unit.

Further, in order to increase a screening speed, a fixed number of first test voltages are set to form the test voltage set. In some embodiments, the sum of the first number and the second number may be equal to the fixed number (i.e., D) which is less than the number of control voltages in the preset control voltage range.

According to the embodiment of the present disclosure, the test voltage set is formed by screening the fixed number of first test voltages, which can improve the efficiency of measurement for a nonlinear voltage-phase curve.

The process of acquiring the phase and amplitude information of the microwave signal radiated by the antenna unit in the ith row and the jth column in S101 is similar to the above process of acquiring the phase and amplitude information of the reference antenna unit. Specifically, the plurality of first test voltages in the test voltage set are sequentially loaded to the antenna unit of the antenna unit in the ith row and the jth column, and the phase and amplitude information of the microwave signal radiated by the radiation unit of the antenna unit in the ith row and the jth column is acquired by the detection sensor every time one of the plurality of first test voltages is loaded.

The specific implementation process for acquiring a plurality of first array vectors in S102 includes: analyzing, by a vector analyzer, the phase and amplitude information of the microwave signals radiated by the antenna unit in the ith row and the jth column under different first test voltages, to obtain a plurality of first array vectors.

In the embodiment of the present disclosure, a first array vector of the antenna unit in the phased array antenna is denoted as $\vec{S_t}$, and a response vector corresponding to the antenna units is denoted as $\vec{S_c}$. The response vector $\vec{S_c}$ may represent an absolute phase of the microwave signal radiated by the antenna unit under a corresponding first test voltage. Alternatively, the response vector $\vec{S_c}$ may also represent an amplitude of the microwave signal radiated by the antenna unit under a corresponding first test voltage. However, the embodiment of the present disclosure does not relate to a calibration of the amplitude, which is not described in detail here.

Under each first test voltage (i.e., $v_1, v_2, \ldots, v_r, \ldots, v_D$), each first array vector St corresponding to the first test voltage are acquired through analysis, and may represent a sum of response vectors corresponding to antenna units in the phased array antenna. By taking the first test voltage $v_r$ as an example, a first array vector of the antenna unit in the ith row and the jth column is $\vec{S_{t,ij}^r} = \vec{S_{c,11}^r} + \ldots + \vec{S_{c,ij}^r} + \ldots + \vec{S_{c,MN}^r}$.

In a specific implementation for S103, for each first test voltage in the test voltage set, an environment vector is removed from the first array vector, to obtain the calibration response vector of the antenna unit in the ith row and the jth column under the first test voltage. The environment vector is used for representing a sum of response vectors corresponding to other antenna units except the antenna unit in the ith row and the jth column in the phased array antenna.

The environment vector is expressed as $\vec{S_E}$ and may represent a sum of response vectors corresponding to other antenna units except the antenna unit in the ith row and the jth column in the phased array antenna. By taking the first test voltage $v_r$ as an example, the environment vector is $\vec{S_E} = \vec{S_{c,11}^r} + \ldots + \vec{S_{c,(i-1)j}^r} + \vec{S_{c,i(j-1)}^r} + \ldots + \vec{S_{c,MN}^r}$.

The calibrated phase and amplitude information includes phase and amplitude information obtained by calibrating the phase information of the microwave signal radiated by the antenna unit in the ith row and the jth column under the first test voltage. For the calibrated phase information in the calibrated phase and amplitude information, it can be understood that the calibrated phase information may be calibrated absolute phase information obtained after processing the first array vectors and removing fixed noise in a scene where the microwave signal is located.

Specifically, by taking the first test voltage $v_r$ as an example, for each first test voltage in the test voltage set, the first array vector is $\vec{S_{t,ij}^r} = \vec{S_{c,11}^r} + \ldots + \vec{S_{c,ij}^r} + \ldots + \vec{S_{c,MN}^r} = \vec{S_E} + \vec{S_{c,ij}^r}$. Correspondingly, a vector having a phase difference of 180° from $\vec{S_{t,ij}^r}$ is expressed as $\vec{S_{t,ij}^{r-}}$, a test voltage corresponding to $\vec{S_{t,ij}^{r-}}$ is expressed as $v_{r-}$, $v_{r-} \in V$. That is, the test voltage $v_{r-}$ is a first test voltage in the test voltage set. Different test voltages are loaded to a same antenna unit, the environment vector $\vec{S_E}$ of the antenna unit is not changed, $\vec{S_{c,ij}^r}$ and $\vec{S_{c,ij}^{r-}}$ offset each other. Therefore, following formulas are derived:

$$\vec{S_E} = \frac{\vec{S_{t,ij}^r} + \vec{S_{t,ij}^{r-}}}{2} \quad (1)$$

$$\vec{S_{c,ij}^r} = \vec{S_{t,ij}^r} - \frac{\vec{S_{t,ij}^r} + \vec{S_{t,ij}^{r-}}}{2} \quad (2)$$

In the embodiment of the present disclosure, according to phase shift ranges of the antenna units in the phased array antenna, a plurality of different vector synthesis modes can be set, to remove the environment vector from the first array vector and obtain the calibration response vector of the antenna unit in the ith row and the jth column under each first test voltage. The specific vector synthesis modes are as follows.

Figure 2:
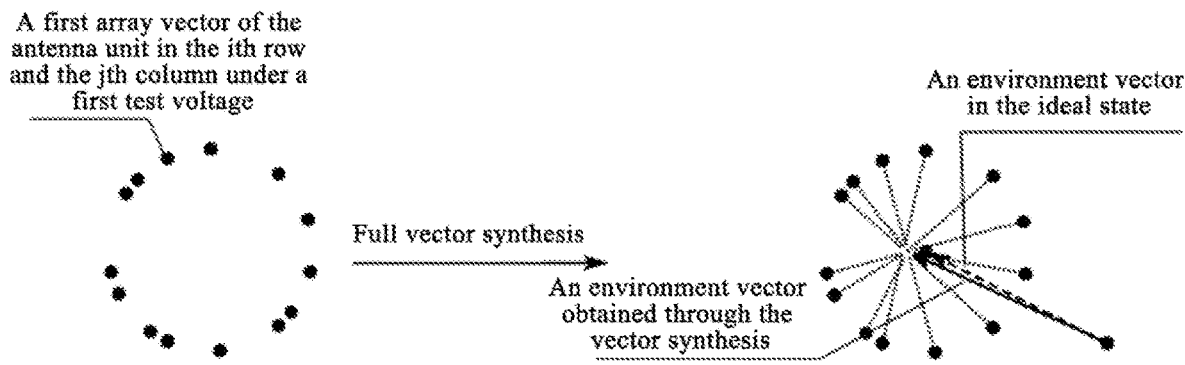
FIG. 2 is a schematic diagram of a full vector synthesis according to an embodiment of the present disclosure.

A first vector synthesis mode is a full vector synthesis. FIG. 2 is a schematic diagram of a full vector synthesis according to an embodiment of the present disclosure. The specific process of the vector synthesis is as follows.

When it is determined based on the phase information of the microwave signal radiated by the antenna unit in the ith row and the jth column that the phase shift range of the antenna unit in the ith row and the jth column is between 359° and 360°, a sum of the first array vectors may be determined based on the first array vector of the antenna unit in the ith row and the jth column under each first test voltage.

Specifically, according to the absolute phase of the microwave signal radiated by the antenna unit in the ith row and the jth column, if it is determined that the phase shift range of the antenna unit in the ith row and the jth column is close to 360° (for example, between 350° and 360° after each first test voltage is applied to the antenna unit in the ith row and the jth column, the sum $\Sigma_r^D \vec{S_{t,ij}^r}$ of the first array vectors may be determined based on the first array vectors $\vec{S_{t,ij}^1}$, $\vec{S_{t,ij}^2}, \ldots, \vec{S_{t,ij}^r}, \ldots \vec{S_{t,ij}^D}$ of the antenna unit in the ith row and the jth column under all first test voltages. Then, based on the sum of the first array vectors and the number of the first array vectors, the environment vector corresponding to the antenna unit in the ith row and the jth column may be determined. Specifically, based on the determined sum $\Sigma_r^D \vec{S_{t,ij}^r}$ of the first array vectors, in a case where the environment vector $\vec{S_E}$ is not changed and $\vec{S_{c,ij}^r}$ and $\vec{S_{c,ij}^{r-}}$ offset each other, a formula (3) for determining the environment vector of the antenna unit in the ith row and the jth column may be derived:

$$\vec{S_E} = \frac{\sum_r^D \vec{S_{t,ij}^r}}{D} \quad (3)$$

By taking the first test voltage $v_r$ as an example, the environment vector $\vec{S_E}$ is removed from the first array vector $\vec{S_{t,ij}^r}$, and the calibration response vector $\vec{S_{c,ij}^r}$ of the antenna unit in the ith row and the jth column under the first test voltage $v_r$ is obtained, see the following formula (4):

$$\vec{S_{c,ij}^r} = \vec{S_{t,ij}^r} - \frac{\sum_r^D \vec{S_{t,ij}^r}}{D} \quad (4)$$

In the above full vector synthesis mode, the first array vectors measured by the single antenna unit under different first test voltages are summed. The phase shift range of the antenna unit is close to 360°, all the response vectors $\vec{S_{c,ij}}$ with the phase difference of 180° offset each other, so that only the sum of D environment vectors remains, and the greater the number of the offset response vectors $\vec{S_{c,ij}}$ are, the higher the accuracy of the determined calibration response vector $\vec{S_{c,ij}^r}$ of the antenna unit in the ith row and the jth column under the first test voltage $v_r$ is.

Figure 3:
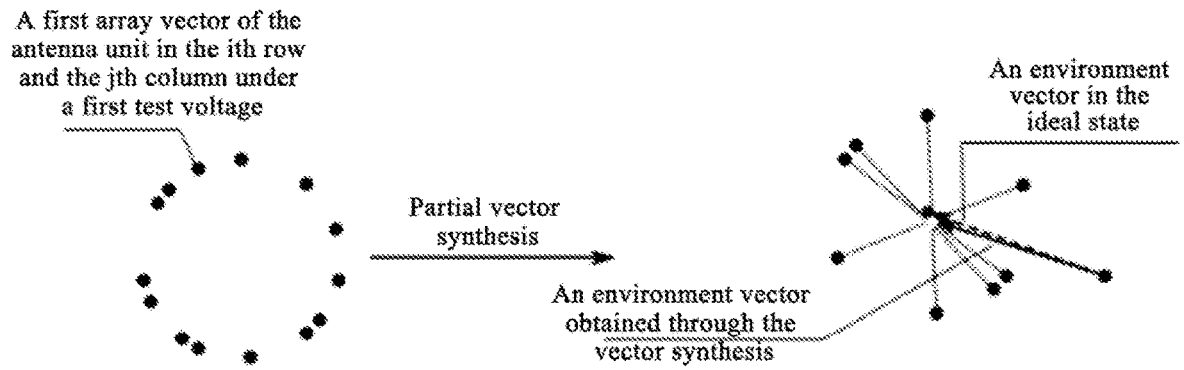
FIG. 3 is a schematic diagram of a partial vector synthesis according to an embodiment of the present disclosure.

A second vector synthesis mode is a partial vector synthesis. FIG. 3 is a schematic diagram of a partial vector synthesis according to an embodiment of the present disclosure. The specific process of the vector synthesis is as follows.

A plurality of pairs of second array vectors with a phase difference of 180° are screened from the first array vectors of the antenna unit in the ith row and the jth column under all first test voltages based on the phase information of the microwave signal radiated by the antenna unit in the ith row and the jth column.

Specifically, every time one of the plurality of first tests is loaded to the antenna unit in the ith row and the jth column, the first array vector under the first test voltage is obtained, thereby obtaining the plurality of first array vectors $\vec{S_{t,ij}^1}$, $\vec{S_{t,ij}^2}$, ... $\vec{S_{t,ij}^r}$, ... $\vec{S_{t,ij}^D}$; and the plurality of pairs of second array vectors with a phase difference of 180° are screened from the obtained plurality of first array vectors. That is, Q sets of $\vec{S_{t,ij}^r}$ and $\vec{S_{t,ij}^{r-}}$ are screened, 2Q second array vectors in total, where 0<2Q≤D, and Q is a positive integer.

A sum $\Sigma_r^{2Q} \vec{S_{t,ij}^r}$ of the screened second array vectors is determined.

The environment vector corresponding to the antenna unit in the ith row and the jth column is determined based on the sum of the second array vectors and the number of the second array vectors. Specifically, based on the determined sum $\Sigma_r^{2Q} \vec{S_{t,ij}^r}$ of the second array vectors, in a case where the environment vector $\vec{S_E}$ is not changed and $\vec{S_{c,ij}^r}$ and $\vec{S_{c,ij}^{r-}}$ offset each other, a formula (5) for determining the environment vector of the antenna unit in the ith row and the jth column may be derived:

$$\vec{S_E} = \frac{\sum_r^{2Q} \vec{S_{t,ij}^r}}{2Q} \quad (5)$$

By taking the first test voltage $v_r$ as an example, the environment vector $\vec{S_E}$ is removed from the first array vector $\vec{S_{t,ij}^r}$, and the calibration response vector $\vec{S_{c,ij}^r}$ of the antenna unit in the ith row and the jth column under the first test voltage $v_r$ is obtained, see the following formula (6):

$$\vec{S_{c,ij}^r} = \vec{S_{t,ij}^r} - \frac{\sum_r^{2Q} \vec{S_{t,ij}^r}}{2Q} \quad (6)$$

The above partial vector synthesis mode is suitable for a case where the antenna unit has a phase shift range greater than 180° and smaller than 360°. Compared with the full vector synthesis mode, the partial vector synthesis mode can improve the number of response vectors $\vec{S_{c,ij}}$ offset each other, and can improve the accuracy of the calibration response vector $\vec{S_{c,ij}^r}$ of the antenna unit in the ith row and the jth column under the first test voltage $v_r$ by selecting a part of the first array vectors (i.e., 2Q second array vectors) for the vector synthesis.

Figure 4:
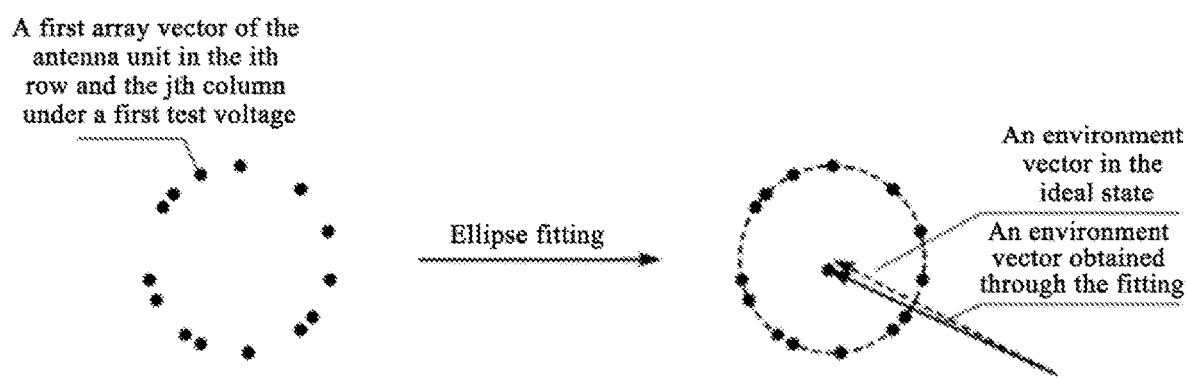
FIG. 4 is a schematic diagram of an ellipse fitting according to an embodiment of the present disclosure.

A third vector synthesis mode is an ellipse fitting. FIG. 4 is a schematic diagram of an ellipse fitting according to an embodiment of the present disclosure. The specific process of the ellipse fitting is as follows:

The ellipse fitting is performed on the first array vectors of the antenna unit in the ith row and the jth column under all first test voltages, to obtain the environment vector corresponding to the antenna unit in the ith row and the jth column.

Specifically, for the first array vectors $\vec{S_{t,ij}^1}$, $\vec{S_{t,ij}^2}$, ..., $\vec{S_{t,ij}^r}$, ... $\vec{S_{t,ij}^D}$ obtained under all first test voltages, the ellipse fitting is performed on the plurality of first array vectors by using a least square method, that is, the fitting is performed by using an elliptic equation as a model, so that a certain elliptic equation satisfies the plurality of first array vectors as much as possible, and each parameter of the elliptic equation is solved.

After the environment vector is obtained, the environment vector is removed from the first array vectors, to obtain the calibration response vector of the antenna unit in the ith row and the jth column under each first test voltage. By taking the first test voltage $v_r$ as an example, it can be seen from $\vec{S_{t,ij}^r} = \vec{S_E} + \vec{S_{c,ij}^r}$ that the calibration response vector of the antenna unit in the ith row and the jth column under the first test voltage $v_r$ is $\vec{S_{c,ij}^r} = \vec{S_{t,ij}^r} - \vec{S_E}$.

It should be noted that in FIGS. 2 to 4, a vector from the origin of coordinates to a center of the ellipse is the environment vector in the ideal state, but due to the influence of a random noise, the environment vector finally obtained by the vector synthesis or the ellipse fitting is only close to the environment vector in the ideal state.

In the above first to third modes, by using the full vector synthesis mode, the partial vector synthesis mode, or the ellipse fitting mode, the calibrated response vector of each antenna unit under each first test voltage may be obtained in a case where the phase shift amounts of different antenna units are different from each other, and a calibrated target voltage-phase curve for the antenna unit may be further obtained.

It should be noted that by taking the first test voltage as an example for the description above, and the calibration response vector of the antenna unit in the ith row and the jth column under each first test voltage is obtained. For the embodiment of other first test voltages in the test voltage set, the same principle as the first test voltage is applied, and repeated descriptions are omitted.

For a specific implementation of determining a target voltage-phase curve corresponding to the antenna unit in the ith row and the jth column in S103, the method includes: determining the target voltage-phase curve corresponding to the antenna unit in the ith row and the jth column based on each first test voltage and the calibrated phase information of the microwave signal radiated by the antenna unit in the ith row and the jth column under each first test voltage.

The obtained calibration response vectors of the antenna unit in the ith row and the jth column under the respective first test voltages include $\overrightarrow{S_{c,ij}^{1}}, \overrightarrow{S_{c,ij}^{2}}, \ldots, \overrightarrow{S_{c,ij}^{r}}, \ldots, \overrightarrow{S_{c,ij}^{D}}$. Based on this, a correspondence between all the first test voltages and the calibration response vectors may be determined. For example, the first test voltage $v_1$ corresponds to the calibration response vector $\overrightarrow{S_{c,ij}^{1}}$; the first test voltage $v_2$ corresponds to the calibration response vector $\overrightarrow{S_{c,ij}^{2}}$; ...; the first test voltage $v_r$ corresponds to the calibration response vector $\overrightarrow{S_{c,ij}^{r}}$; ...; the first test voltage $v_D$ corresponds to the calibration response vector $\overrightarrow{S_{c,ij}^{D}}$.

After the correspondence between all the first test voltages and the calibrated phase information of the microwave signals radiated by the antenna unit in the ith row and the jth column is determined, a smoother target voltage-phase curve is obtained through a function fitting according to all the first test voltages and the calibrated absolute phases indicated by the calibrated phase information corresponding to the first test voltages.

Figure 5A:
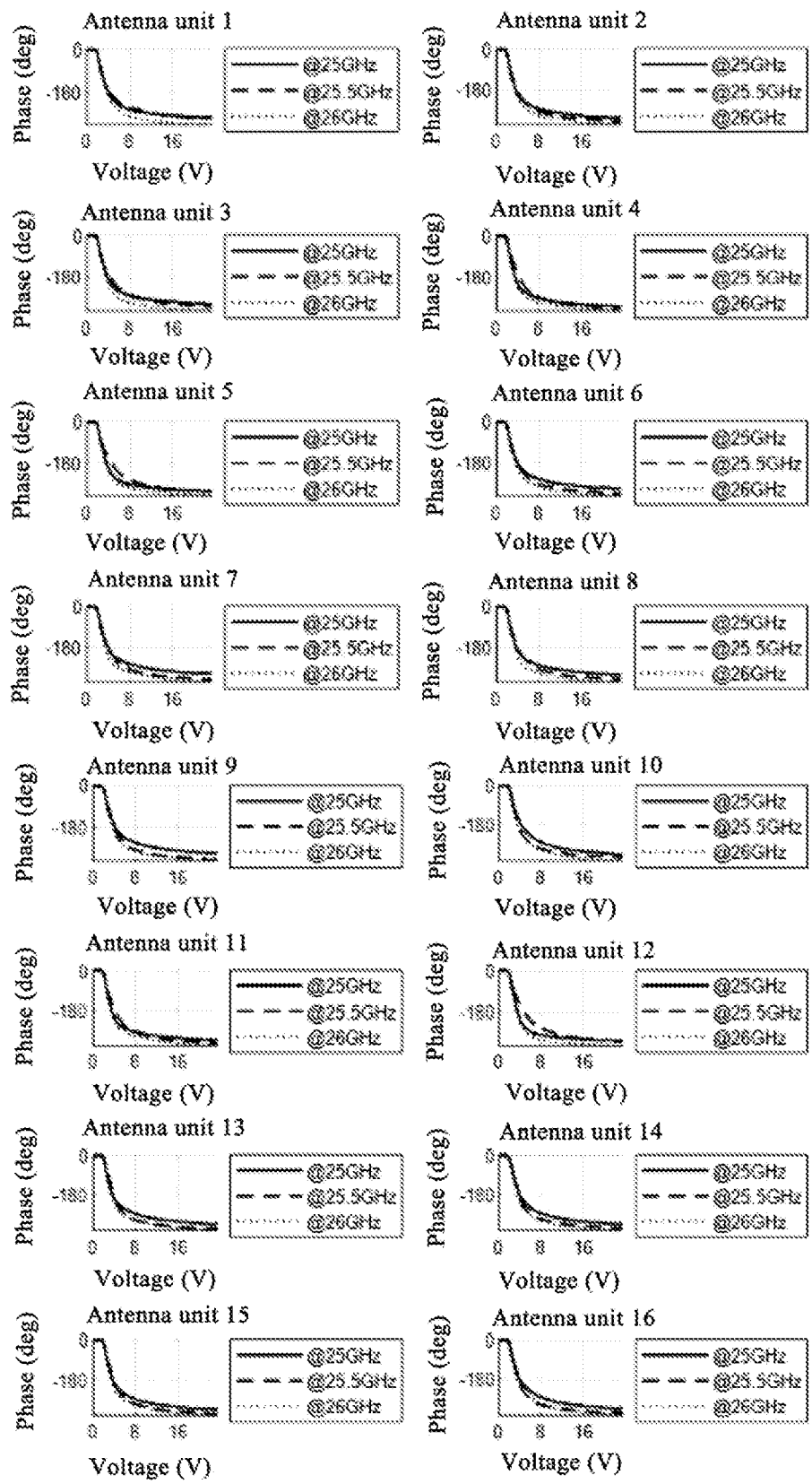
FIG. 5a is a schematic diagram showing voltage-phase curves of antenna units of a horizontally polarized liquid crystal phased array antenna according to an embodiment of the present disclosure.
Figure 5B:
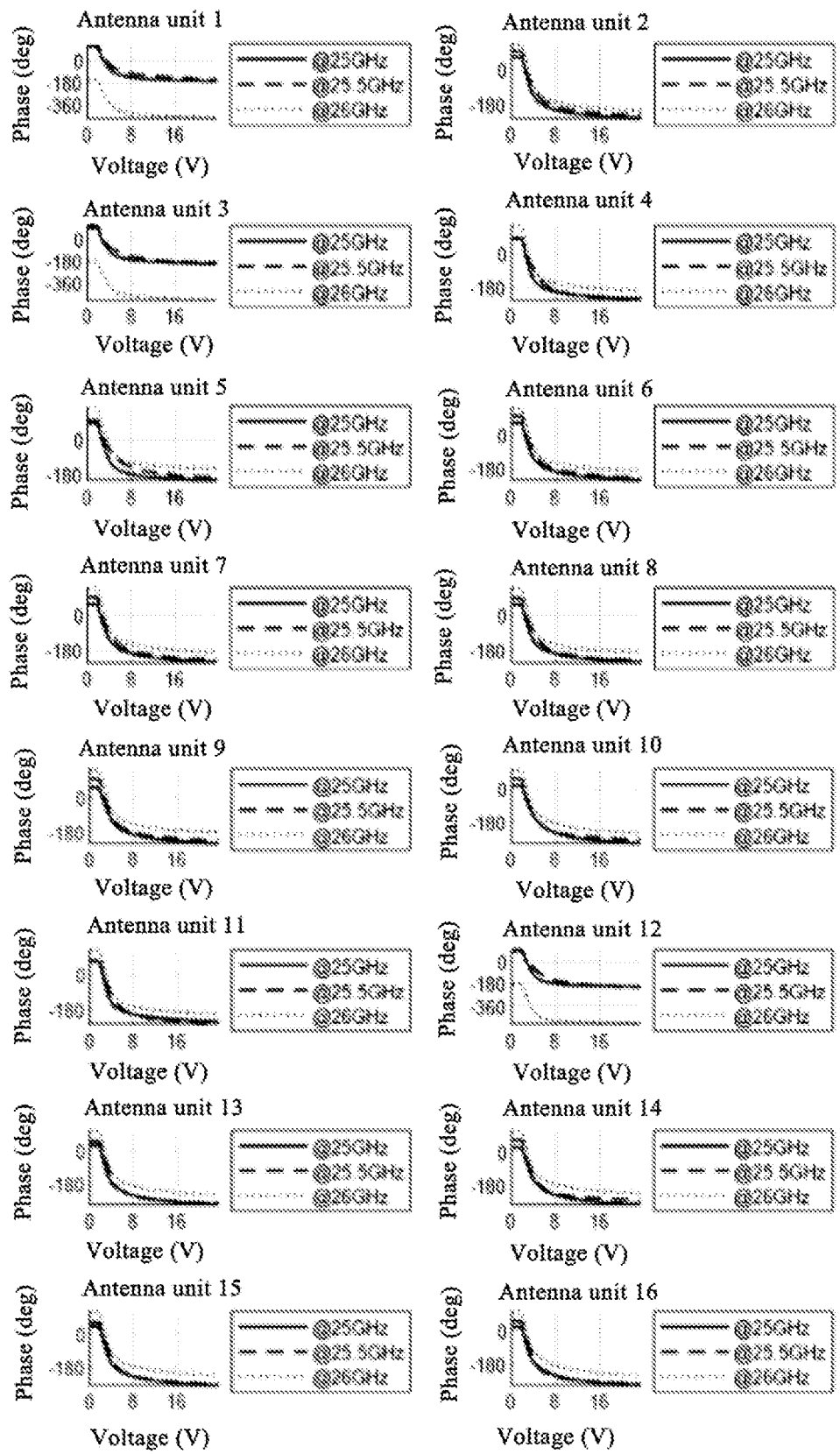
FIG. 5b is a schematic diagram showing voltage-phase curves of antenna units of a vertically polarized liquid crystal phased array antenna according to an embodiment of the present disclosure.

FIG. 5a is a schematic diagram showing voltage-phase curves of antenna units of a horizontally polarized liquid crystal phased array antenna. FIG. 5b is a schematic diagram showing voltage-phase curves of antenna units of a vertically polarized liquid crystal phased array antenna. FIGS. 5a and 5b show characteristic curves of 1×16 antenna units taken as an example at different frequencies (that is, voltage-phase curves of the antenna units at different frequencies). The solid lines represent curves of the antenna units at a frequency of 25 GHz; the long dashed lines represent curves of the antenna units at a frequency of 25.5 GHz; the short dashed lines represent curves of the antenna units at a frequency of 26 GHz.

In some embodiments, whether to perform polarization synthesis (i.e., whether it is necessary to perform the polarization synthesis) is determined based on the polarization characteristics of the phased array antenna. For example, if the phased array antenna is a dual linear polarization phased array antenna, the calibration response vector includes a horizontal polarization response vector $\overrightarrow{S_v}$ and a vertical polarization response vector $\overrightarrow{S_v}$. The horizontal polarization response vector $\overrightarrow{S_h}$ may be used for representing horizontal polarization phase and amplitude information of the microwave signal radiated by the antenna unit in the ith row and the jth column under the first test voltage; the vertical polarization response vector $\overrightarrow{S_v}$ may be used for representing vertical polarization phase and amplitude information of the microwave signal radiated by the antenna unit in the ith row and the jth column under the first test voltage.

The target voltage-phase curve corresponding to the antenna unit in the ith row and the jth column is determined by the following steps S103-1 and S103-2:

S103-1, performing polarization synthesis on the horizontal polarization response vector $\overrightarrow{S_h}$ and the vertical polarization response vector $\overrightarrow{S_v}$ to obtain a target response vector $\overrightarrow{S_{cp}}$; wherein the target response vector is used for representing target phase and amplitude information of the microwave signal radiated by the antenna unit in the ith row and the jth column under the first test voltage.

Here, the target response vector $\overrightarrow{S_{cp}}$ may be a further calibrated response vector of the microwave signal radiated by the antenna unit in the ith row and the jth column under the first test voltage.

For example, the target response vector $\overrightarrow{S_{rep}}$ for the polarization synthesis as right-hand circular polarization is expressed in formula (7):

$$\overrightarrow{S_{rcp}} = (\overrightarrow{S_v} + j\overrightarrow{S_h})/\sqrt{2} \qquad (7)$$

j represents an imaginary part factor of a complex number.

For example, the target response vector $\overrightarrow{S_{lcp}}$ for the polarization synthesis as left-hand circular polarization is expressed in formula (8):

$$\overrightarrow{S_{lcp}} = (\overrightarrow{S_v} + j\overrightarrow{S_h})/\sqrt{2} \qquad (8)$$

S103-2, determining the target voltage-phase curve corresponding to the antenna unit in the ith row and the jth column based on each first test voltage and target phase information of the microwave signal radiated by the antenna unit in the ith row and the jth column under each first test voltage.

The target response vectors subjected to the polarization synthesis corresponding to the antenna unit in the ith row and the jth column under the first test voltages are obtained, and include $\overrightarrow{S_{cp,ij}^{1}}, \overrightarrow{S_{cp,ij}^{2}}, \ldots, \overrightarrow{S_{cp,ij}^{r}}, \ldots, \overrightarrow{S_{cp,ij}^{D}}$. Based on this, a correspondence between the first test voltages and corresponding target response vectors can be determined. For example, the first test voltage $v_1$ corresponds to the target response vector $\overrightarrow{S_{cp,ij}^{1}}$ subjected to the polarization synthesis; the first test voltage $v_2$ corresponds to the target response vector $\overrightarrow{S_{cp,ij}^{2}}$ subjected to the polarization synthesis; ...; the first test voltage $v_r$ corresponds to the target response vector $\overrightarrow{S_{cp,ij}^{r}}$ subjected to the polarization synthesis; ...; the first test voltage $v_D$ corresponds to the target response vector $\overrightarrow{S_{cp,ij}^{D}}$ subjected to the polarization synthesis.

After the correspondence between all the first test voltages and the corresponding target phase information of the microwave signals radiated by the antenna unit in the ith row and the jth column is determined, according to the first test voltages and the absolute phases after the polarization synthesis is performed, indicated by the target phase information corresponding to the respective first test voltages, a smoother target voltage-phase curve is obtained through a function fitting.

Figure 6:
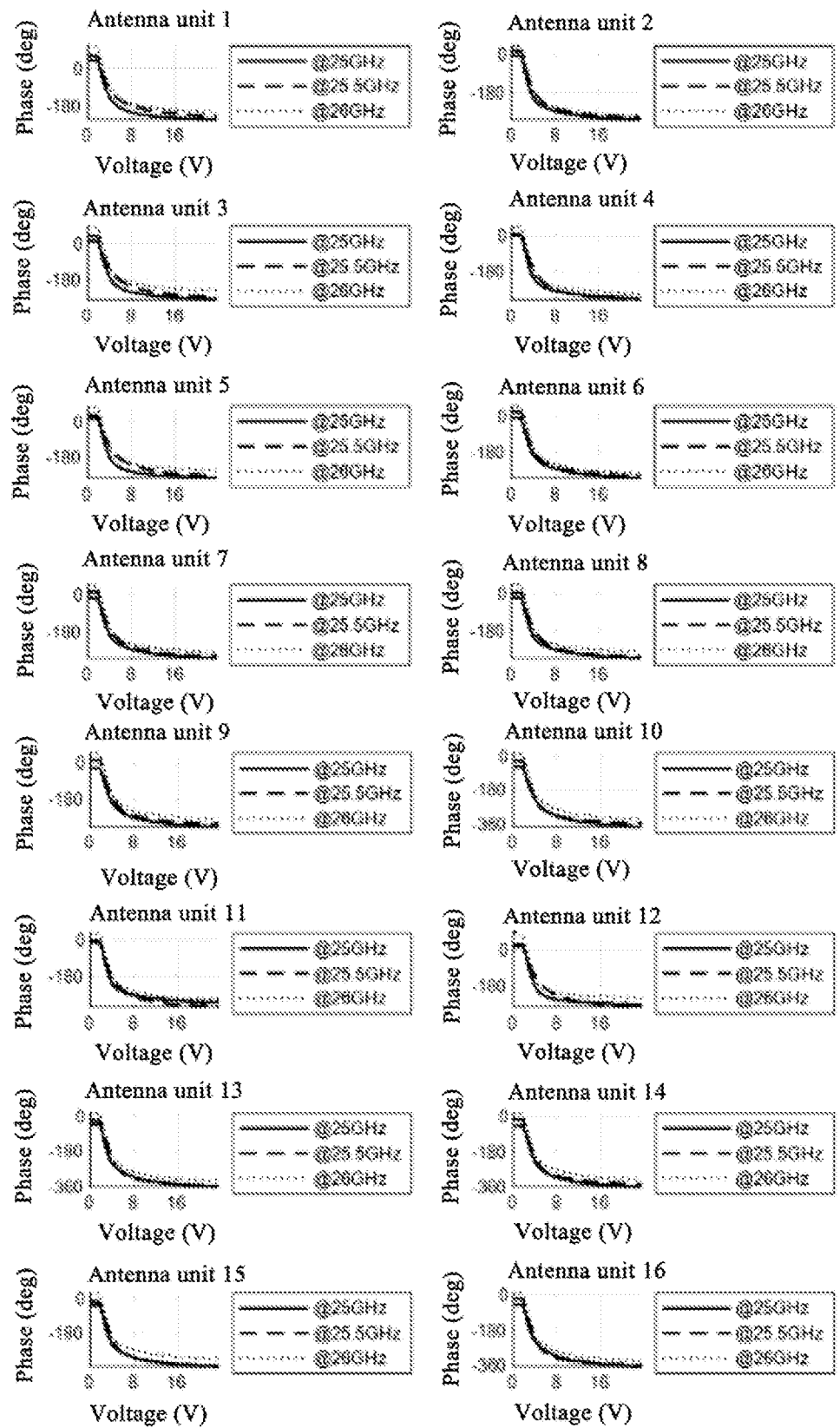
FIG. 6 a schematic diagram showing voltage-phase curves of antenna units of a right-handed polarized liquid crystal phased array antenna according to an embodiment of the present disclosure.

FIG. 6 a schematic diagram showing voltage-phase curves of antenna units of a right-handed polarized liquid crystal phased array antenna. FIG. 6 shows characteristic curves of 1×16 antenna units taken as an example at different frequencies (that is, voltage-phase curves of the antenna units at different frequencies). The solid lines represent curves of the antenna units at a frequency of 25 GHz; the long dashed lines represent curves of the antenna units at a frequency of 25.5 GHz; the short dashed lines represent curves of the antenna units at a frequency of 26 GHz.

In the embodiment, the phase of the phased array antenna with different polarizations can be calibrated by respectively measuring the horizontal polarization response vector and the vertical polarization response vector and performing the corresponding polarization synthesis, so that a more accurate target voltage-phase curve is obtained.

It should be noted that in the embodiment of the present disclosure, the phase calibration is performed by taking the antenna unit in the ith row and the jth column as an example, and a specific implementation process for determining the target voltage-phase curve for other antenna units of the phased array antenna may be obtained by traversing the steps S101 to S103, and repeated descriptions are omitted in the embodiment of the present disclosure.

Figure 7:
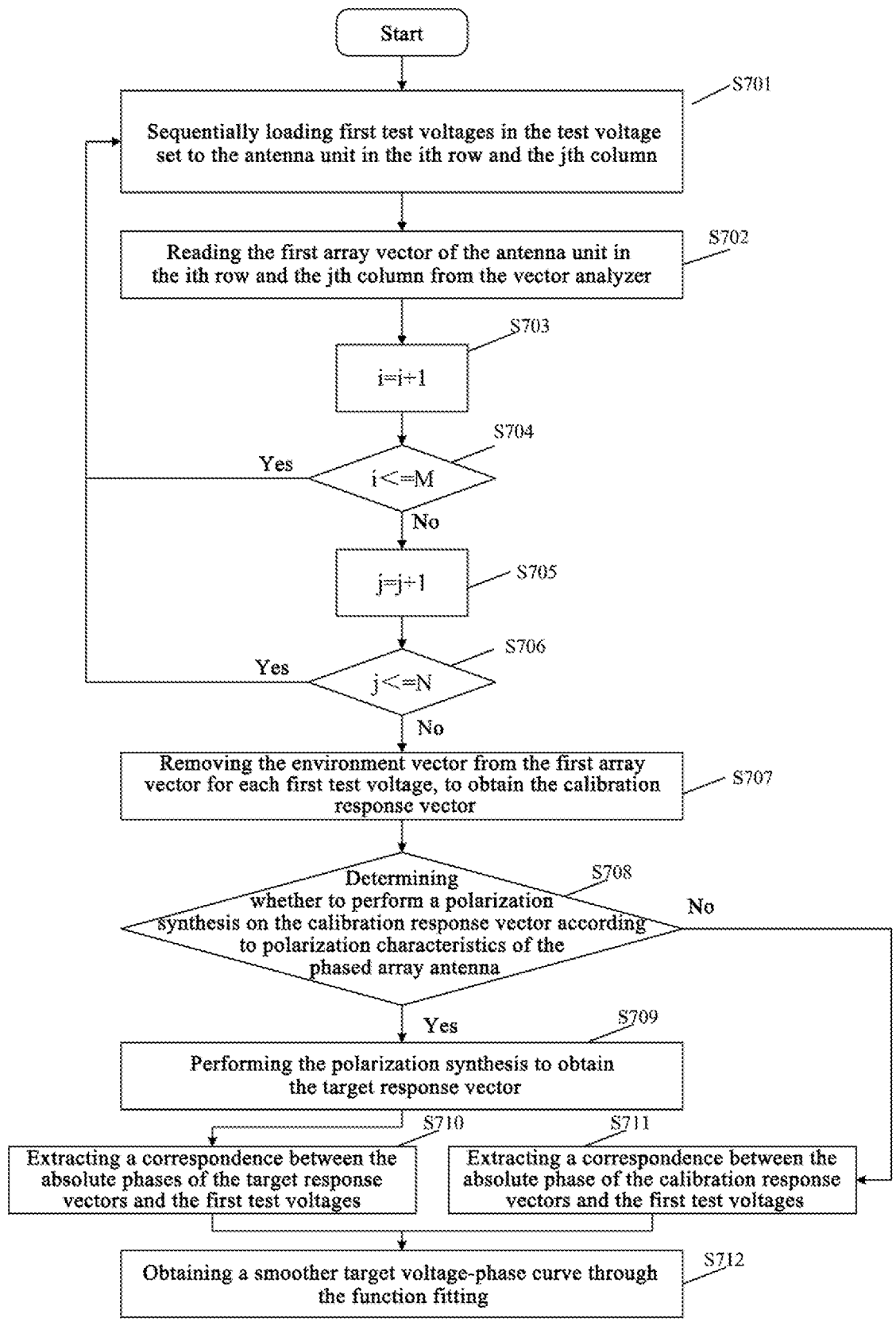
FIG. 7 is a flowchart of traversing each antenna unit to obtain a target voltage-phase curve of each antenna unit according to an embodiment of the present disclosure.

In some embodiments, as shown in FIG. 7, FIG. 7 is a flowchart of traversing each antenna unit to obtain a target voltage-phase curve of each antenna unit. The method includes:

S701, sequentially loading first test voltages in the test voltage set to the antenna unit in the ith row and the jth column; wherein a voltage loading to each of the other antenna units is unchanged or 0V; the flow starts with i=1 and j=1.

S702, reading the first array vector of the antenna unit in the ith row and the jth column from the vector analyzer.

S703, let i=i+1.

S704, judging whether i is less than or equal to M; if so, returning to execute the step S701, and if not, executing the step S705.

S705, let j=j+1.

S706, judging whether j is less than or equal to N; if so, returning to the step S701, and if not, executing the step S707.

S707, removing the environment vector from the first array vector for each first test voltage, to obtain the calibration response vector.

S708, determining whether to perform polarization synthesis on the calibration response vector according to polarization characteristics of the phased array antenna; if so, executing the step S709, and if not, executing the step S711.

S709, performing the polarization synthesis, to obtain the target response vector.

S710, extracting a correspondence between the absolute phases of the target response vectors and all the first test voltages, and then executing the step S712.

S711, extracting a correspondence between the absolute phases of the calibration response vectors and all the first test voltages.

S712, obtaining a smoother target voltage-phase curve through the function fitting.

In some embodiments, the target voltage-phase curve of each antenna unit obtained by the traversal method is used for phase matching, so that accurate beam reconfiguration for the antenna units can be realized. For example, FIG. 8a is a far-field pattern of the phased array antenna at 25.4 GHz obtained by using the phase calibration method for a phased array antenna according to an embodiment of the present disclosure.

Figure 8A:
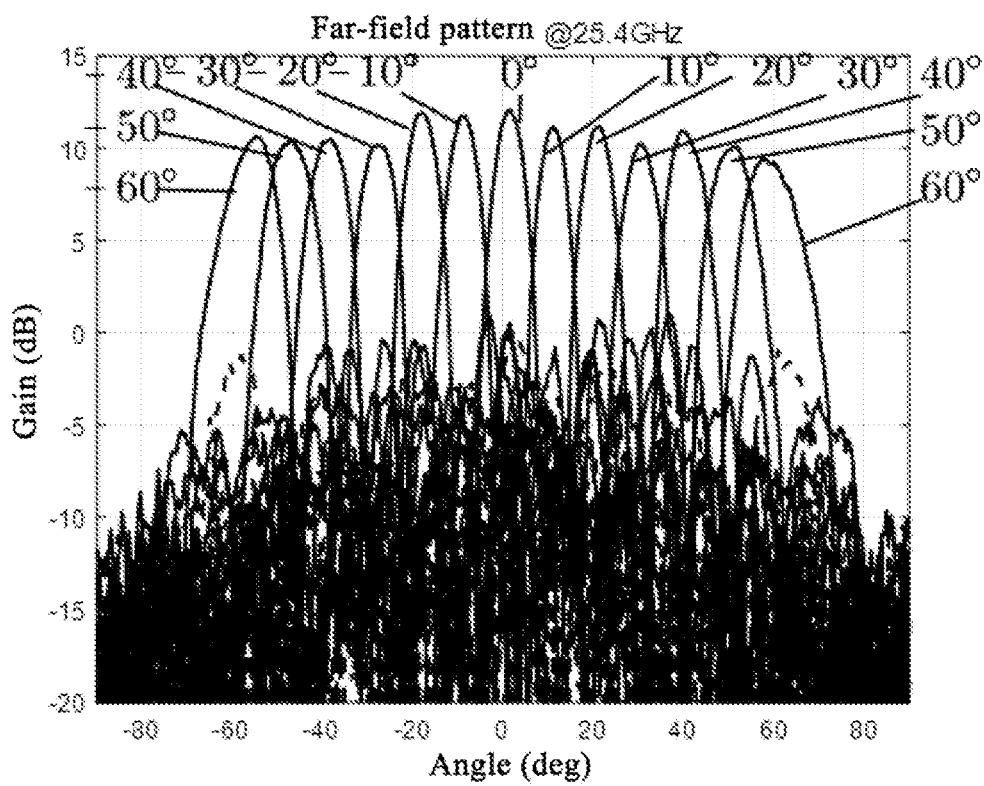
FIG. 8a is a schematic diagram of a far-field pattern of a phased array antenna at 25.4 GHz according to an embodiment of the present disclosure.
Figure 8B:
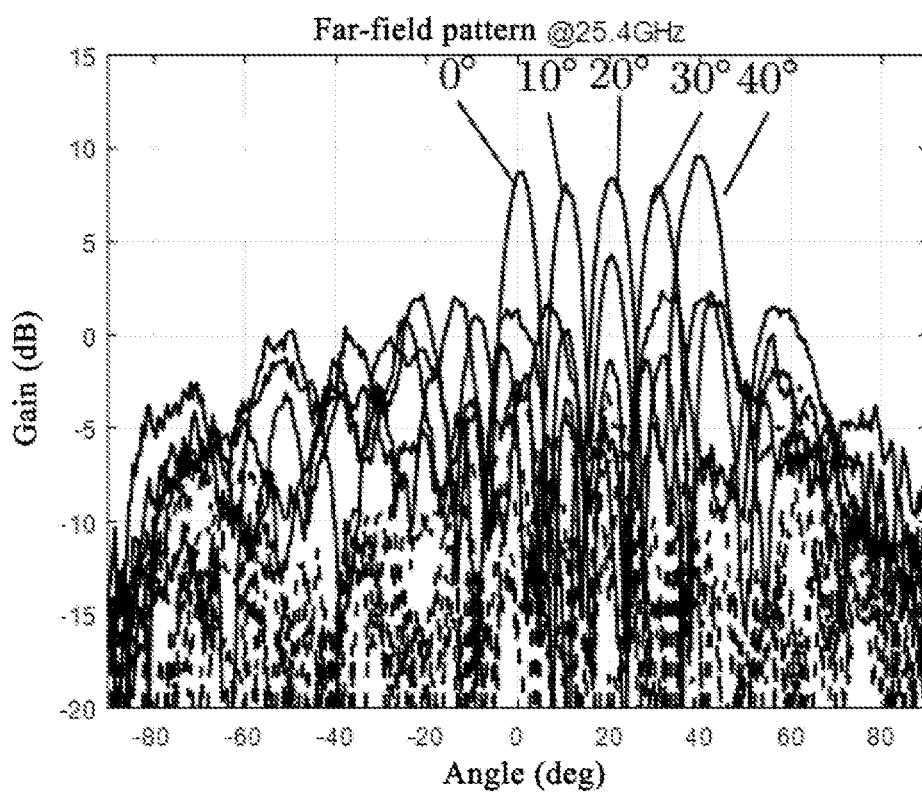
FIG. 8b is another schematic diagram of a far-field pattern of a phased array antenna at 25.4 GHz according to an embodiment of the present disclosure.

If the phase and amplitude information of the antenna unit directly acquired by the detection sensor is used as the phase and amplitude information of the antenna unit under the test voltage, a voltage-phase curve of the antenna unit is generated according to the phase information, and phase matching is performed according to the voltage-phase curve, a far-field pattern of the phased array antenna at 25.4 GHz can be obtained as shown in FIG. 8b.

Comparing the far-field patterns shown in FIG. 8a and FIG. 8b, it can be obviously perceived that the target voltage-phase curve of each antenna unit of the phased array antenna is obtained through the calibration by the phase calibration method for a phased array antenna according to an embodiment of the present disclosure, which can reduce the influence of the environment noise on the phased array antenna, and does not depend on the consistency of antenna units, that is, different types of the antenna units may be selected in the embodiment of the present disclosure.

The calibration for each antenna unit will be described in detail below by taking the mode of pre-screening a test voltage set and then adaptively updating the test voltage set as an example.

In order to ensure the testing efficiency and the calibration precision, in the embodiment of the present disclosure, firstly a pre-sampling is performed, that is, a plurality of control voltages are uniformly sampled from the preset control voltage range to form the test voltage set; and then, a targeted self-adaptive sampling is performed, that is, the test voltage set is updated. The phase of each antenna unit is calibrated by continuously updating the test voltage set until a phase calibration requirement is met.

Figure 9:
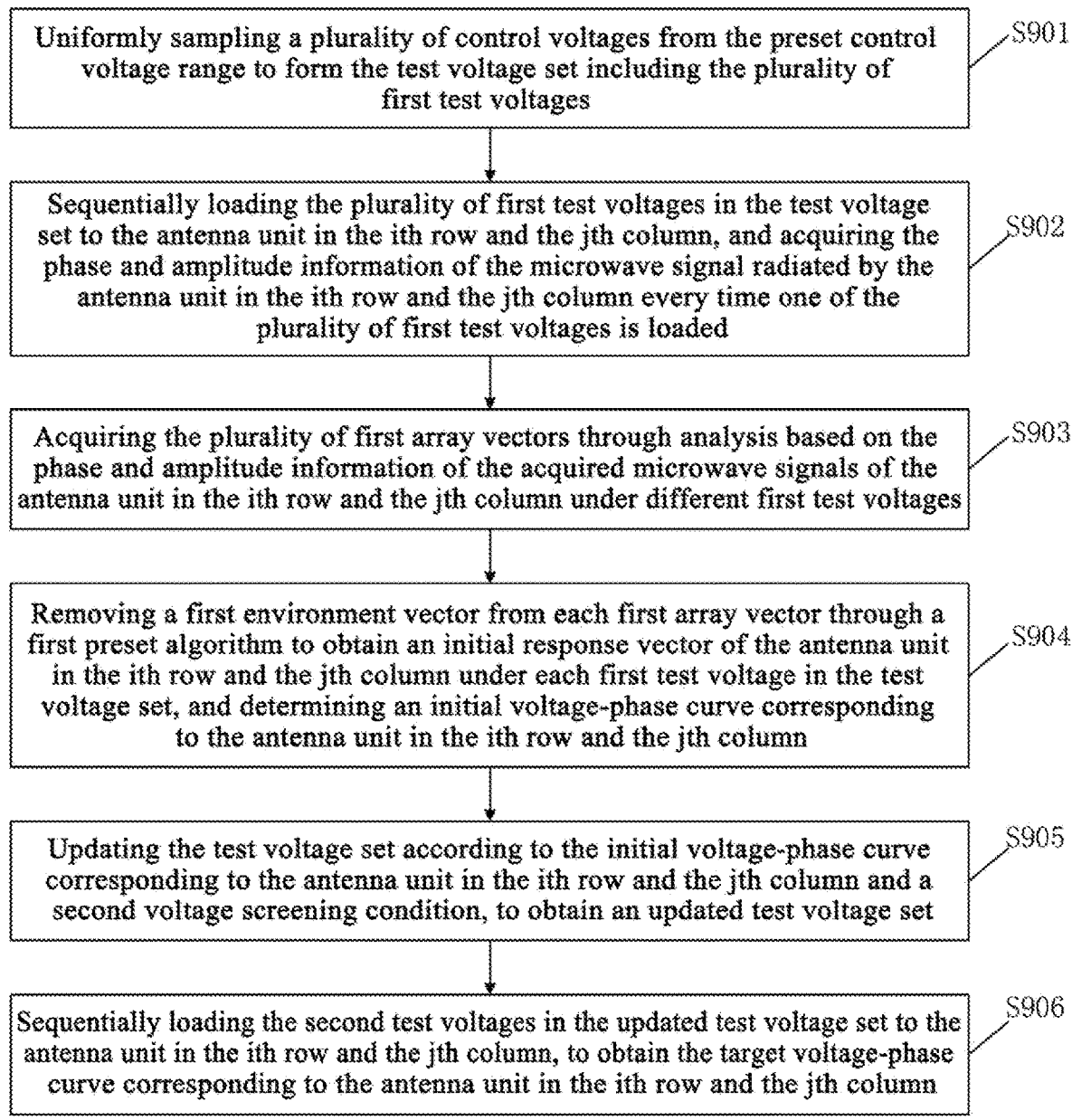
FIG. 9 is a flowchart of another phase calibration method for a phased array antenna according to an embodiment of the present disclosure.

FIG. 9 is a flowchart of another phase calibration method for a phased array antenna according to an embodiment of the present disclosure. The calibration for the antenna unit in the ith row and the jth column includes steps S901 to S906:

S901, uniformly sampling a plurality of control voltages from the preset control voltage range to form the test voltage set including the plurality of first test voltages.

The preset control voltage range includes continuous control voltages. A variation of control voltage may be preset in the uniform sampling process. For example, the plurality of control voltages are uniformly collected from the preset control voltage range with a voltage variation of 0.5V. Alternatively, different voltage variations may also be set in a specific application scenario, which is not particularly limited in the embodiment of the present disclosure.

It should be noted that the number K of the first test voltages in the test voltage set obtained by uniform sampling is smaller than the total number D (i.e., a preset fixed number) of the first test voltages in the test voltage set in the steps S101 to S103 in the above embodiments.

The test voltage set in the embodiments of the present disclosure is $V=(v_1, v_2, \ldots, v_r, \ldots, v_K)$.

By taking the preset control voltage range of 0 to 23.5V as an example, the plurality of control voltages are uniformly sampled. Specifically, by taking the voltage variation of 0.5V as an example, the plurality of control voltages are uniformly sampled and include 47 discrete control voltages (i.e., the first test voltages) of 0.5V, 1V, 1.5V, and . . . 23.5V, thereby forming the test voltage set including the 47 discrete first test voltages.

The calibration for the antenna unit in the ith row and the jth column will be described in detail below as an example. The implementation process of calibrating each of other antenna units in the phased array antenna is the same as that for the antenna unit in the ith row and the jth column, and details are not repeated in the embodiment of the present disclosure.

S902, sequentially loading the plurality of first test voltages in the test voltage set to the antenna unit in the ith row and the jth column, and acquiring the phase and amplitude information of the microwave signal radiated by the antenna unit in the ith row and the jth column every time one of the plurality of first test voltages is loaded.

where $0<i\leq M$, $0<j\leq N$, and i and j are positive integers. For this step, reference may be made to the step of acquiring phase and amplitude information in S101, and repeated descriptions are omitted.

S903, acquiring the plurality of first array vectors through analysis based on the phase and amplitude information of the acquired microwave signals of the antenna unit in the ith row and the jth column under different first test voltages.

Each first array vector is used for representing a sum of the plurality of response vectors of the M×N antenna units in the phased array antenna; each response vector is used for representing the phase and amplitude information of the microwave signal radiated by a corresponding antenna unit under a corresponding first test voltage.

For this step, reference may be made to the step of acquiring a plurality of first array vectors of the antenna unit in the ith row and the jth column through analysis in S102, and repeated descriptions are omitted.

S904, removing a first environment vector from each first array vector through a first preset algorithm, to obtain an initial response vector of the antenna unit in the ith row and the jth column under each first test voltage in the test voltage set, and determining an initial voltage-phase curve corresponding to the antenna unit in the ith row and the jth column.

The first environment vector is used for representing a sum of response vectors corresponding to other antenna units except the antenna unit in the ith row and the jth column in the phased array antenna; the initial response vector is used for representing initial phase and amplitude information of the microwave signal radiated by the antenna unit in the ith row and the jth column under the first test voltage.

In this step, the specific implementation process of removing the first environment vector from each first array vector to obtain the initial response vector of the antenna unit in the ith row and the jth column under the first test voltage may refer to the step of removing the environment vector from each first array vector to obtain the calibration response vector of the antenna unit in the ith row and the jth column under the first test voltage in the above specific implementation of S103, and repeated parts are not described again.

In this step, the specific implementation process of determining the initial voltage-phase curve corresponding to the antenna unit in the ith row and the jth column may refer to the step of determining the target voltage-phase curve corresponding to the antenna unit in the ith row and the jth column in the above specific implementation of S103, and repeated parts are not described again.

For the case that the test voltage set is not updated, the step S905 of updating the test voltage set is executed. For the case where the test voltage set has been updated, the steps S906-3 and S906-4 of verifying the calibration accuracy are performed.

S905, updating the test voltage set according to the initial voltage-phase curve corresponding to the antenna unit in the ith row and the jth column and a second voltage screening condition, to obtain the updated test voltage set.

A test voltage in the updated test voltage set is represented as a second test voltage. The second test voltage in the updated test voltage set includes the first test voltage in the test voltage set which is not updated.

In this step, the second voltage screening condition is preset, and may include, but be not limited to, screening according to the curvature of the voltage-phase curve. The voltage-phase curve includes at least a third line segment; a curvature of the third line segment is within a third preset curvature range. The specific screening process includes the following steps S905-1 to S905-2:

S905-1, acquiring a third control voltage sub-range corresponding to the third line segment.

The third control voltage sub-range corresponding to the third line segment is an abscissa value range corresponding to the third line segment in the voltage-phase curve.

S905-2, screening a third number of control voltages from the third control voltage sub-range as second test voltages, and updating the test voltage set to obtain the updated test voltage set.

A absolute phase indicated by the third line segment has a larger variation with the change of the control voltage, and the third preset curvature range in the embodiment of the present disclosure may be the same as the first preset curvature range. The third number may be a self-adaptive sampling number. At least one control voltage corresponding to a larger curvature in the third line segment is automatically acquired as at least one second test voltage according to a curvature of the initial voltage-phase curve and is added to the test voltage set, to obtain the updated test voltage set.

S906, sequentially loading the second test voltages in the updated test voltage set to the antenna unit in the ith row and the jth column, to obtain the target voltage-phase curve corresponding to the antenna unit in the ith row and the jth column.

Because the number of the second test voltages is greater than that of the first test voltages in the test voltage set which is not updated, the phase calibration is performed on each antenna unit based on the updated test voltage set, which will obtain the first array vectors of the antenna unit corresponding to the updated test voltage set. However, further, it is necessary to verify whether the phase calibration meets the preset calibration accuracy requirement, which is specifically referred to the following steps S906-1 to S906-5:

S906-1, sequentially loading the second test voltages in the updated test voltage set to the antenna unit in the ith row and the jth column, and acquiring phase and amplitude information of the microwave signal radiated by the antenna unit in the ith row and the jth column every time one of the second test voltages is loaded.

For this step, reference may be made to the step of acquiring the phase and amplitude information in S101, and repeated descriptions are omitted.

S906-2, acquiring the plurality of first array vectors through analysis based on the phase and amplitude information of the acquired microwave signals of the antenna unit in the ith row and the jth column under different second test voltages.

For this step, reference may be made to the step of acquiring the plurality of first array vectors of the antenna unit in the ith row and the jth column through analysis in S102, and repeated descriptions are omitted.

S906-3, extracting a second environment vector from each first array vector through the first preset algorithm based on the first array vector.

The second environment vector is used for representing the sum of response vectors corresponding to other antenna units except the antenna unit in the ith row and the jth column in the phased array antenna.

In this step, the specific implementation process of extracting the second environment vector may refer to the process of determining the environment vector $\vec{S_E}$ (in modes for extracting the environment vector, including the full vector synthesis mode, the partial vector synthesis mode, the ellipse fitting mode, and the like) in the specific implementation process of step S103, and repeated descriptions are omitted.

S906-4, in a case where an error between the second environment vector and the first environment vector is smaller than a preset value, obtaining the calibration response vector of the antenna unit in the ith row and the jth column under each first test voltage in the test voltage set through the first preset algorithm.

The calibration response vector is used for representing the calibrated phase and amplitude information of the microwave signal radiated by the antenna unit in the ith row and the jth column under the first test voltage.

In this step, the first environment vector $\vec{S_{E1}}$ is an environment vector corresponding to the antenna unit in the ith row and the jth column obtained based on the previous test voltage set (i.e., the test voltage set which is not updated); and the second environment vector $\vec{S_{E2}}$ is an environment vector corresponding to the antenna unit in the ith row and the jth column obtained based on the updated test voltage set.

It should be noted that the updated test voltage set is obtained after the previous test voltage set (i.e., the test voltage set which is not updated) is updated once.

The error between the second environment vector and the first environment vector is represented as $|\vec{S_{E2}} - \vec{S_{E1}}|$, ε is a preset value. $|\vec{S_{E2}} - \vec{S_{E1}}| < \varepsilon$ indicates that the phase calibration performed on the antenna unit in the ith row and the jth column based on the updated test voltage set meets the preset calibration accuracy requirement, so that the phase calibration on the antenna unit in the ith row and the jth column is stopped, and the second environment vector may be removed from each first array vector to obtain a calibration response vector of the antenna unit in the ith row and the jth column under each second test voltage.

S906-5, determining the target voltage-phase curve corresponding to the antenna unit in the ith row and the jth column based on each second test voltage and the calibrated phase information of the microwave signal radiated by the antenna unit in the ith row and the jth column under each second test voltage.

For this step, reference may be made to the specific implementation process of determining the target voltage-phase curve corresponding to the antenna unit in the ith row and the jth column in the above step S103, and repeated parts are not described again.

As a continuation of S906-4, if the error between the second environment vector and the first environment vector is greater than or equal to the preset value, the test voltage set may be continuously updated based on the second environment vector until the error between the second environment vector and the first environment vector is less than the preset value.

In specific implementation, if the error between the second environment vector and the first environment vector is greater than or equal to the preset value, the test voltage set is continuously updated based on the second environment vector until the error between the second environment vector and the first environment vector is less than the preset value. Specifically, based on the second environment vector, it returns to execute S904 until the error between the second environment vector and the first environment vector is smaller than the preset value in a new cycle.

Figure 10:
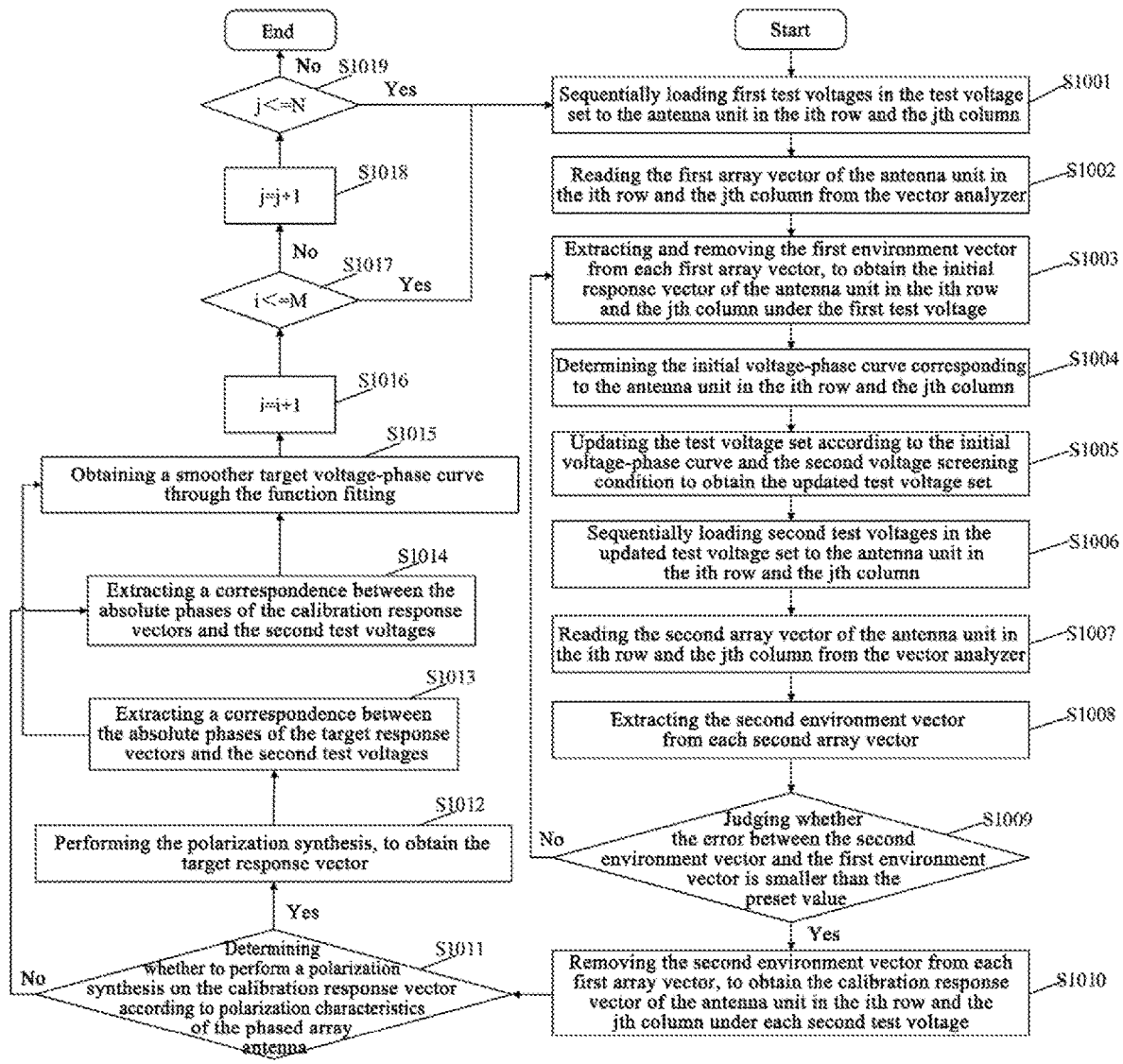
FIG. 10 is a flowchart of traversing each antenna unit to obtain a target voltage-phase curve of each antenna unit according to an embodiment of the present disclosure.

In some embodiments, as shown in FIG. 10, FIG. 10 is a flowchart of traversing each antenna unit to obtain a target voltage-phase curve of each antenna unit. The method includes:

S1001, sequentially loading first test voltages in the test voltage set to the antenna unit in the ith row and the jth column; wherein a voltage loading to each of the other antenna units is unchanged or 0V; the flow starts with i=1 and j=1.

S1002, reading the first array vector of the antenna unit in the ith row and the jth column from the vector analyzer.

S1003, extracting and removing the first environment vector from each first array vector, to obtain the initial response vector of the antenna unit in the ith row and the jth column under the first test voltage.

S1004, determining the initial voltage-phase curve corresponding to the antenna unit in the ith row and the jth column.

S1005, updating the test voltage set according to the initial voltage-phase curve and the second voltage screening condition to obtain the updated test voltage set.

S1006, sequentially loading second test voltages in the updated test voltage set to the antenna unit in the ith row and the jth column; wherein a voltage loading to each of the other antenna units is unchanged or 0V.

S1007, reading the second array vector of the antenna unit in the ith row and the jth column from the vector analyzer.

S1008, extracting the second environment vector from each second array vector.

S1009, judging whether the error between the second environment vector and the first environment vector is smaller than the preset value; if so, executing S1010; if not, returning to execute S1003 based on the second array vector, to obtain an initial response vector of the antenna unit in the ith row and the jth column under each second test voltage, and continuing to execute S1004.

S1010, removing the second environment vector from each first array vector, to obtain the calibration response vector of the antenna unit in the ith row and the jth column under each second test voltage;

S1011, determining whether to perform polarization synthesis on the calibration response vector according to polarization characteristics of the phased array antenna; and if so, executing S1012; if not, executing S1014.

S1012, performing the polarization synthesis, to obtain the target response vector.

S1013, extracting a correspondence between the absolute phases of the target response vectors and the second test voltages, and then executing the step S1015.

S1014, extracting a correspondence between the absolute phases of the calibration response vectors and the second test voltages.

S1015, obtaining a smoother target voltage-phase curve through the function fitting.

S1016, let i=i+1.

S1017, judging whether i is smaller than or equal to M; if so, returning to execute the step S1001, and if not, executing the step S1018.

S1018, let j=j+1.

S1019, judging whether j is smaller than or equal to N; if so, returning to execute the step S1001, and if not, ending the process.

In some embodiments, the step of obtaining an initial response vector of the antenna unit in the ith row and the jth column under each first test voltage in the test voltage set through a first preset algorithm based on the plurality of first array vectors, specifically includes: in a case where it is determined based on the phase information of the microwave signal radiated by the antenna unit in the ith row and the jth column that the phase shift range of the antenna unit in the ith row and the jth column is between 359° and 360°, determining a sum of first array vectors based on the first array vectors of the antenna unit in the ith row and the jth column under all first test voltages; determining the first environment vector corresponding to the antenna unit in the ith row and the jth column based on the sum and the number of the first array vectors; and removing the first environment vector from each first array vector, to obtain the initial response vector of the antenna unit in the ith row and the jth column under each first test voltage.

For a specific implementation process of determining the initial response vector in this embodiment, reference may be made to the above mode 1 for determining the calibration response vector by the full vector synthesis, and repeated descriptions are omitted.

In some embodiments, the step of obtaining an initial response vector of the antenna unit in the ith row and the jth column under each first test voltage in the test voltage set through a first preset algorithm based on the plurality of first array vectors, specifically includes:

Screening a plurality of pairs of second array vectors with a phase difference of 180° from the plurality of first array vectors of the antenna unit in the ith row and the jth column under all first test voltages based on the phase information of the microwave signal radiated by the antenna unit in the ith row and the jth column; determining a sum of the screened second array vectors; determining the first environment vector corresponding to the antenna unit in the ith row and the jth column based on the sum and the number of the second array vectors; and removing the first environment vector from each first array vector, to obtain the initial response vector of the antenna unit in the ith row and the jth column under each first test voltage.

For a specific implementation process of determining the initial response vector in this embodiment, reference may be made to the above mode 2 for determining the calibration response vector by the partial vector synthesis, and repeated descriptions are omitted.

In some embodiments, the step of obtaining an initial response vector of the antenna unit in the ith row and the jth column under each first test voltage in the test voltage set through a first preset algorithm based on the plurality of first array vectors, specifically includes:

Performing an ellipse fitting on the plurality of first array vectors of the antenna unit in the ith row and the jth column under all first test voltages, to obtain the first environment vector corresponding to the antenna unit in the ith row and the jth column; and removing the first environment vector from each first array vector, to obtain the initial response vector of the antenna unit in the ith row and the jth column under each first test voltage.

For a specific implementation process of determining the initial response vector in this embodiment, reference may be made to the above mode 3 for determining the calibration response vector by the ellipse fitting, and repeated descriptions are omitted.

In some embodiments, the calibration response vector includes a horizontal polarization response vector and a vertical polarization response vector. The horizontal polarization response vector may be used for representing horizontal polarization phase and amplitude information of the microwave signal radiated by the antenna unit in the ith row and the jth column under the second test voltage; the vertical polarization response vector may be used for representing the vertical polarization phase and amplitude information of the microwave signal radiated by the antenna unit in the ith row and the jth column under the second test voltage.

The step of obtaining a target voltage-phase curve corresponding to the antenna unit in the ith row and the jth column includes:

performing polarization synthesis on the horizontal polarization response vector and the vertical polarization response vector, to obtain a target response vector; where the target response vector is used for representing target phase and amplitude information of the microwave signal radiated by the antenna unit in the ith row and the jth column under the second test voltage; and determining the target voltage-phase curve corresponding to the antenna unit in the ith row and the jth column based on each second test voltage and target phase information of the microwave signal radiated by the antenna unit in the ith row and the jth column under each second test voltage.

The polarization synthesis of the embodiment of the present disclosure refers to the above mode of performing the polarization synthesis for the horizontal polarization response vector and the vertical polarization response vector, and repeated descriptions are omitted.

Figure 11:
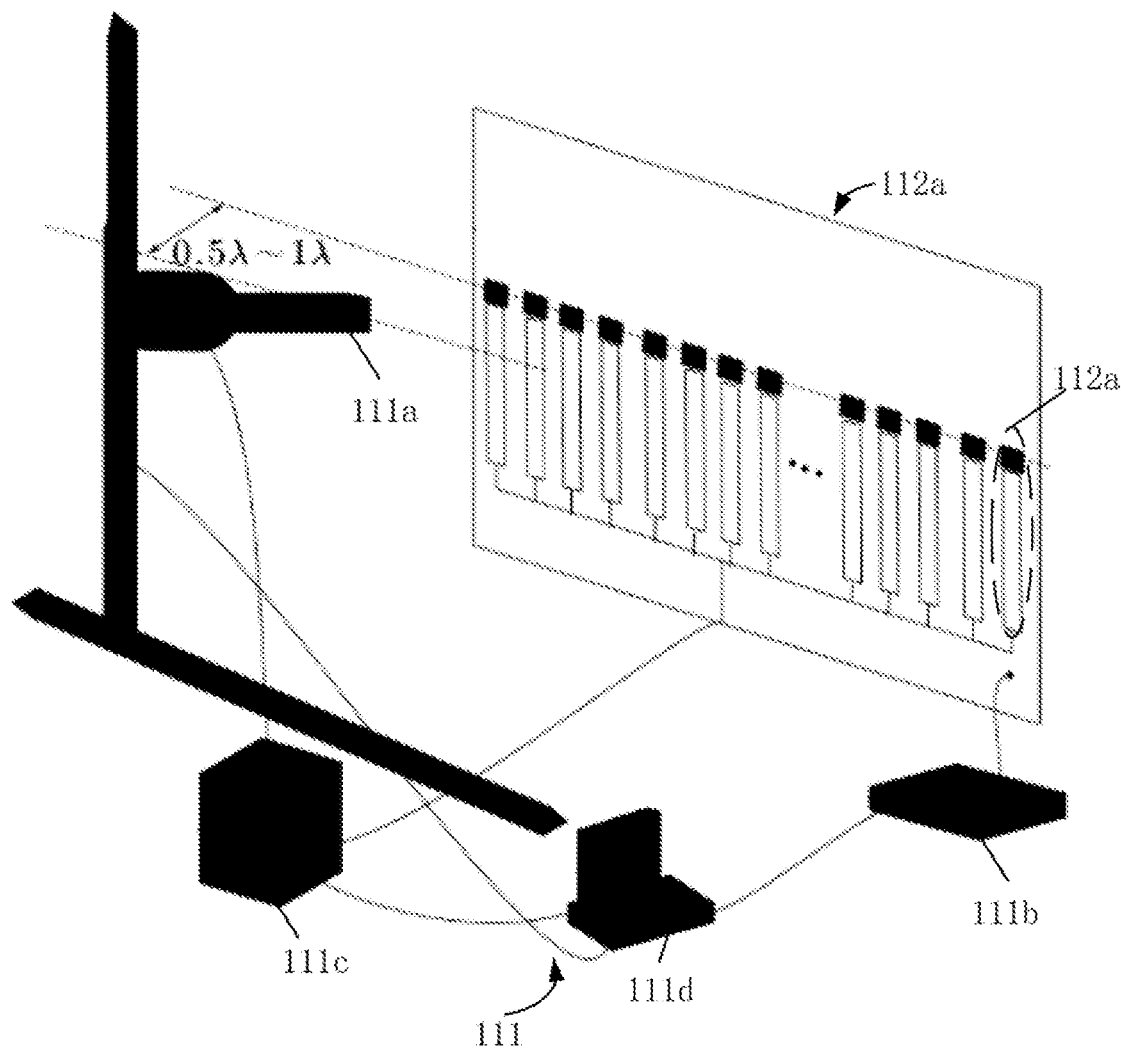
FIG. 11 is a schematic diagram of a phase calibration system for a phased array antenna according to an embodiment of the present disclosure.

FIG. 11 is a schematic diagram of a phase calibration system for a phased array antenna according to an embodiment of the present disclosure. The phase calibration system 110 for a phased array antenna includes the phase calibration apparatus 111 for a phased array antenna and the phased array antenna 112.

Based on the same inventive concept, the embodiment of the present disclosure further provides a phase calibration apparatus for a phased array antenna, and a principle for solving problems by the phase calibration apparatus for a phased array antenna in embodiments of the present disclosure is similar to that for the phase calibration method for a phased array antenna in embodiments of the present disclosure, so that specific descriptions for the phase calibration apparatus for a phased array antenna may refer to those for the phase calibration method for a phased array antenna, and repeated parts are not described again.

In a manner of screening a fixed number of first test voltages to form the test voltage set, an embodiment of the present disclosure provides a phase calibration apparatus 111 for a phased array antenna, where the phased array antenna 112 includes M×N antenna units 112a arranged in an array, where one of M and N is a positive integer which is greater than or equal to 1, and the other one is a positive integer which is greater than or equal to 2.

The phase calibration apparatus 111 for a phased array antenna is configured to sequentially calibrate the M×N antenna units 112a based on a pre-obtained test voltage set; the test voltage set includes a plurality of first test voltages.

The phase calibration apparatus 111 for a phased array antenna includes a detection sensor 111a, a voltage supply apparatus 111b, a vector analyzer 111c and a controller 111d, wherein the voltage supply apparatus 111b is configured to sequentially load the plurality of first test voltages in the test voltage set to the antenna unit in the ith row and the jth column under the control of the controller 111d; where $0<i\leq M$, $0<j\leq N$, and i and j are positive integers.

The detection sensor 111a is configured to acquire phase and amplitude information of a microwave signal radiated by the antenna unit in the ith row and the jth column every time one of the plurality of first test voltages is loaded to the antenna unit in the ith row and the jth column by the voltage supply apparatus 111b; and transmit the phase and amplitude information to the vector analyzer 111c.

The vector analyzer 111c is configured to acquire a plurality of first array vectors through analysis based on the phase and amplitude information of the acquired microwave signals of the antenna unit in the ith row and the jth column under different first test voltages; and transmit the plurality of first array vectors to the controller 111d; where each first array vector is used for representing a sum of a plurality of response vectors of the M×N antenna units; each response vector is used for representing the phase and amplitude information of the microwave signal radiated by a corresponding antenna unit under a corresponding first test voltage.

The controller 111d is configured to obtain a calibration response vector of the antenna unit in the ith row and the jth column under each first test voltage in the test voltage set through a first preset algorithm based on the plurality of first array vectors, and determine a target voltage-phase curve corresponding to the antenna unit in the ith row and the jth column; where the calibration response vector is used for representing the calibrated phase and amplitude information of the microwave signal radiated by the antenna unit in the ith row and the jth column under the first test voltage.

In some embodiments, the voltage supply apparatus 111b is configured to sequentially load a plurality of control voltages in a preset control voltage range to a reference antenna unit under the control of the controller 111d; where the reference antenna unit is any one of the M×N antenna units.

The detection sensor 111a is configured to acquire phase and amplitude information of a microwave signal radiated by the reference antenna unit every time one of the plurality of control voltages is loaded to the reference antenna by the voltage supply apparatus 111b, and transmit the phase and amplitude information to the vector analyzer 111c.

The controller 111d is configured to generate a voltage-phase curve corresponding to the reference antenna unit according to each control voltage and the phase information acquired under the control voltage; and screen some control voltages from the preset control voltage range as the first test voltages according to the voltage-phase curve corresponding to the reference antenna unit and a first voltage screening condition, to obtain the test voltage set.

In some embodiments, the voltage-phase curve includes at least a first line segment and a second line segment; a curvature of the first line segment is within a first preset curvature range, and a curvature of the second line segment is within a second preset curvature range; each curvature in the first preset curvature range is greater than that in the second preset curvature range.

The controller 111d is configured to acquire a first control voltage sub-range corresponding to the first line segment, and acquire a second control voltage sub-range corresponding to the second line segment; and screen a first number of control voltages from the first control voltage sub-range as first test voltages, and screen a second number of control voltages from the second control voltage sub-range as first test voltages, to obtain the test voltage set; where the first number is greater than the second number.

In some embodiments, the controller 111d is configured to remove an environment vector from the first array vector for each first test voltage in the test voltage set, so as to obtain a calibration response vector of the antenna unit in the ith row and the jth column under the first test voltage; where the environment vector is used for representing a sum of response vectors corresponding to other antenna units except the antenna unit in the ith row and the jth column in the phased array antenna; and determine the target voltage-phase curve corresponding to the antenna unit in the ith row and the jth column based on each first test voltage and the calibrated phase information of the microwave signal radiated by the antenna unit in the ith row and the jth column under the first test voltage.

In some embodiments, the controller 111d is configured to in a case where it is determined based on the phase information of the microwave signal radiated by the antenna unit in the ith row and the jth column that the phase shift range of the antenna unit in the ith row and the jth column is between 359° and 360°, determine a sum of first array vectors based on the first array vectors of the antenna unit in the ith row and the jth column under first test voltages; determine the environment vector corresponding to the antenna unit in the ith row and the jth column based on the sum and the number of the first array vectors; and remove the environment vector from each first array vector, to obtain the calibration response vector of the antenna unit in the ith row and the jth column under each first test voltage.

In some embodiments, the controller 111d is configured to screen a plurality of pairs of second array vectors, in which each pair of second array vector have a phase difference of 180° therebetween, from the plurality of first array vectors of the antenna unit in the ith row and the jth column under the first test voltages based on the phase information of the microwave signals radiated by the antenna unit in the ith row and the jth column; determine a sum of the screened second array vectors; determine the environment vector corresponding to the antenna unit in the ith row and the jth column based on the sum and the number of the second array vectors; and remove the environment vector from each first array vector, to obtain the calibration response vector of the antenna unit in the ith row and the jth column under each first test voltage.

In some embodiments, the controller 111d is configured to perform an ellipse fitting on the plurality of first array vectors of the antenna unit in the ith row and the jth column under first test voltages, to obtain the environment vector corresponding to the antenna unit in the ith row and the jth column; and removing the environment vector from each first array vector, to obtain the calibration response vector of the antenna unit in the ith row and the jth column under each first test voltage.

In some embodiments, the calibration response vector includes a horizontal polarization response vector and a vertical polarization response vector. The horizontal polarization response vector may be used for representing horizontal polarization phase and amplitude information of the microwave signal radiated by the antenna unit in the ith row and the jth column under the first test voltage; the vertical polarization response vector may be used for representing the vertical polarization phase and amplitude information of the microwave signal radiated by the antenna unit in the ith row and the jth column under the first test voltage.

The controller 111d is configured to perform polarization synthesis on the horizontal polarization response vector and the vertical polarization response vector, to obtain a target response vector; where the target response vector is used for representing target phase and amplitude information of the microwave signal radiated by the antenna unit in the ith row and the jth column under the first test voltage; and determine the target voltage-phase curve corresponding to the antenna unit in the ith row and the jth column based on each first test voltage and target phase information of the microwave signal radiated by the antenna unit in the ith row and the jth column under each first test voltage.

In a manner of adaptively updating the test voltage set as an updated test voltage set, an embodiment of the present disclosure provides a phase calibration apparatus 111 for a phased array antenna, where the phased array antenna 112 includes M×N antenna units arranged in an array, where one of M and N is a positive integer which is greater than or equal to 1, and the other one is a positive integer which is greater than or equal to 2.

The phase calibration apparatus 111 for a phased array antenna includes a detection sensor 111a, a voltage supply apparatus 111b, a vector analyzer 111c and a controller 111d.

The controller 111d is configured to uniformly sample a plurality of control voltages from the preset control voltage range to form the test voltage set; wherein the test voltage set includes the plurality of first test voltages; and obtain an initial response vector of the antenna unit in the ith row and the jth column under each first test voltage in the test voltage set through a first preset algorithm based on the first array vector, and determine an initial voltage-phase curve corresponding to the antenna unit in the ith row and the jth column; wherein the initial response vector is used for representing initial phase and amplitude information of the microwave signal radiated by the antenna unit in the ith row and the jth column under the first test voltage; update the test voltage set according to the initial voltage-phase curve corresponding to the antenna unit in the ith row and the jth column and a second voltage screening condition, to obtain the updated test voltage set; and obtain a target voltage-phase curve corresponding to the antenna unit in the ith row and the jth column through a second preset algorithm.

The voltage supply apparatus 111b is configured to sequentially load the plurality of first test voltages in the test voltage set to the antenna unit in the ith row and the jth column under the control of the controller 111d; 0<i≤M, 0<j≤N, and i and j are positive integers; and sequentially load second test voltages in the updated test voltage set to the antenna unit in the ith row and the jth column under the control of the controller 111d.

The detection sensor 111a is configured to acquire phase and amplitude information of a microwave signal radiated by the antenna unit in the ith row and the jth column every time one of the plurality of first test voltages is loaded to the antenna unit in the ith row and the jth column by the voltage supply apparatus 111b; and transmit the phase and amplitude information to the vector analyzer 111c.

The vector analyzer 111c is configured to acquire a plurality of first array vectors through analysis based on the phase and amplitude information of the acquired microwave signals of the antenna unit in the ith row and the jth column under different first test voltages; where each first array vector is used for representing a sum of a plurality of response vectors of the M×N antenna units; each response vector is used for representing the phase and amplitude information of the microwave signal radiated by a corresponding antenna unit under a corresponding first test voltage.

In some embodiments, the voltage supply apparatus 111b is configured to sequentially load the second test voltages in the updated test voltage set to the antenna unit in the ith row and the jth column under the control of the controller 111d.

The detection sensor 111a is configured to acquire phase and amplitude information of the microwave signal radiated by the antenna unit in the ith row and the jth column every time one of the second test voltages is loaded to the antenna unit in the ith row and the jth column by the voltage supply apparatus 111b, and transmit the phase and amplitude information to the vector analyzer 111c.

The vector analyzer 111c is configured to acquire a plurality of first array vectors through analysis based on the phase and amplitude information of the acquired microwave signals of the antenna unit in the ith row and the jth column under different second test voltages.

The controller 111d is configured to extract a second environment vector from each first array vector through the first preset algorithm based on the first array vector; where the second environment vector is used for representing the sum of response vectors corresponding to other antenna units except the antenna unit in the ith row and the jth column in the phased array antenna; in a case where an error between the second environment vector and the first environment vector is smaller than a preset value, obtain a calibration response vector of the antenna unit in the ith row and the jth column under each first test voltage in the test voltage set through the first preset algorithm; where the calibration response vector is used for representing the calibrated phase and amplitude information of the microwave signal radiated by the antenna unit in the ith row and the jth column under the first test voltage; and determine the target voltage-phase curve corresponding to the antenna unit in the ith row and the jth column based on each second test voltage and the calibrated phase information of the microwave signal radiated by the antenna unit in the ith row and the jth column under each second test voltage.

In some embodiments, the controller 111d is configured to continuously update the test voltage set based on the second environment vector in a case where the error between the second environment vector and the first environment vector is greater than or equal to the preset value, until the error between the second environment vector and the first environment vector is less than the preset value.

In some embodiments, the initial voltage-phase curve includes at least a third line segment; a curvature of the third line segment is within a third preset curvature range. The controller 111d is configured to acquire a third control voltage sub-range corresponding to the third line segment; and screen a third number of control voltages from the third control voltage sub-range as second test voltages, and update the test voltage set to obtain the updated test voltage set.

In some embodiments, the controller 111d is configured to determine a sum of the first array vectors of the antenna unit in the ith row and the jth column under the first test voltages in a case where it is determined, based on the phase information of the microwave signals radiated by the antenna unit in the ith row and the jth column, that the phase shift range of the antenna unit in the ith row and the jth column is between 359° and 360°; determine the first environment vector corresponding to the antenna unit in the ith row and the jth column based on the sum and the number of the first array vectors; and remove the first environment vector from each first array vector, to obtain the initial response vector of the antenna unit in the ith row and the jth column under each first test voltage.

In some embodiments, the controller 111d is configured to screen a plurality of pairs of second array vectors, each pair having a phase difference of 180° therebetween, from the plurality of first array vectors of the antenna unit in the ith row and the jth column under the first test voltages based on the phase information of the microwave signals radiated by the antenna unit in the ith row and the jth column; determine a sum of the screened second array vectors; determine the first environment vector corresponding to the antenna unit in the ith row and the jth column based on the sum and the number of the second array vectors; and remove the first environment vector from each first array vector, to obtain the initial response vector of the antenna unit in the ith row and the jth column under each first test voltage.

In some embodiments, the controller 111d is configured to perform an ellipse fitting on the plurality of first array vectors of the antenna unit in the ith row and the jth column under first test voltages, to obtain the first environment vector corresponding to the antenna unit in the ith row and the jth column; and removing the first environment vector from each first array vector, to obtain the initial response vector of the antenna unit in the ith row and the jth column under each first test voltage.

In some embodiments, the calibration response vector includes a horizontal polarization response vector and a vertical polarization response vector. The horizontal polarization response vector may be used for representing horizontal polarization phase and amplitude information of the microwave signal radiated by the antenna unit in the ith row and the jth column under the second test voltage; the vertical polarization response vector may be used for representing the vertical polarization phase and amplitude information of the microwave signal radiated by the antenna unit in the ith row and the jth column under the second test voltage.

The controller 111d is configured to perform polarization synthesis on the horizontal polarization response vector and the vertical polarization response vector, to obtain a target response vector; where the target response vector is used for representing target phase and amplitude information of the microwave signal radiated by the antenna unit in the ith row and the jth column under the second test voltage; and determine the target voltage-phase curve corresponding to the antenna unit in the ith row and the jth column based on each second test voltage and target phase information of the microwave signal radiated by the antenna unit in the ith row and the jth column under each second test voltage.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase calibration method for a phased array antenna, wherein the phased array antenna comprises M×N antenna units arranged in an array, where one of M and N is a positive integer which is greater than or equal to 1, and the other one of M and N is a positive integer which is greater than or equal to 2; the phase calibration method comprises:
sequentially calibrating the M×N antenna units based on a test voltage set which is determined in advance; wherein the test voltage set comprises a plurality of first test voltages; wherein
calibrating an antenna unit in an ith row and a jth column of the M×N antenna units comprises:
sequentially loading the plurality of first test voltages to the antenna unit in the ith row and the jth column, and acquiring phase and amplitude information of a microwave signal radiated by the antenna unit in the ith row and the jth column every time one of the plurality of first test voltages is loaded; where $0<i\leq M$, $0<j\leq N$, and i and j are positive integers;
acquiring a plurality of first array vectors through analysis based on the phase and amplitude information of the acquired microwave signals of the antenna unit in the ith row and the jth column under different first test voltages; wherein each of the plurality of first array vectors is used for representing a sum of a plurality of response vectors of the M×N antenna units; each of the plurality of response vectors is used for representing the phase and amplitude information of the microwave signal radiated by a corresponding antenna unit under a corresponding first test voltage; and
obtaining a calibration response vector of the antenna unit in the ith row and the jth column under each first test voltage in the test voltage set through a first preset algorithm based on the first array vector, and determining a target voltage-phase curve corresponding to the antenna unit in the ith row and the jth column; wherein the calibration response vector is used for representing the calibrated phase and amplitude information of the microwave signal radiated by the antenna unit in the ith row and the jth column under the first test voltage.

2. The phase calibration method for a phased array antenna of claim 1, wherein the test voltage set is determined by:
sequentially loading a plurality of control voltages in a preset control voltage range to a reference antenna unit, and acquiring phase and amplitude information of a microwave signal radiated by the reference antenna unit every time one of the plurality of control voltages is loaded; wherein the reference antenna unit is any one of the M×N antenna units;
generating a voltage-phase curve corresponding to the reference antenna unit according to the plurality of control voltages and respective phase information acquired under the plurality of control voltages; and
screening a part of the plurality of control voltages from the preset control voltage range as the first test voltages according to the voltage-phase curve corresponding to the reference antenna unit and a first voltage screening condition, to obtain the test voltage set.

3. The phase calibration method for a phased array antenna of claim 2, wherein the voltage-phase curve comprises at least a first line segment and a second line segment; a curvature of the first line segment is within a first preset curvature range, and a curvature of the second line segment is within a second preset curvature range; each curvature in the first preset curvature range is greater than that in the second preset curvature range;
the screening a part of the plurality of control voltages from the preset control voltage range as the first test voltages according to the voltage-phase curve corresponding to the reference antenna unit and a first voltage screening condition, to obtain the test voltage set, comprises:
acquiring a first control voltage sub-range corresponding to the first line segment, and acquiring a second control voltage sub-range corresponding to the second line segment; and
screening a first number of control voltages from the first control voltage sub-range as the first test voltages, and screening a second number of control voltages from the second control voltage sub-range as the first test voltages, to obtain the test voltage set; wherein the first number is greater than the second number.

4. The phase calibration method for a phased array antenna of claim 1, wherein the obtaining a calibration response vector of the antenna unit in the ith row and the jth column under each first test voltage in the test voltage set through a first preset algorithm based on the first array vector, and determining a target voltage-phase curve corresponding to the antenna unit in the ith row and the jth column, comprises:

for each first test voltage in the test voltage set, removing an environment vector from the first array vector, to obtain the calibration response vector of the antenna unit in the ith row and the jth column under the first test voltage; wherein the environment vector is used for representing a sum of response vectors corresponding to other antenna units except the antenna unit in the ith row and the jth column in the phased array antenna; and determining the target voltage-phase curve corresponding to the antenna unit in the ith row and the jth column based on all the first test voltages and the calibrated phase information of the respective microwave signals radiated by the antenna unit in the ith row and the jth column under all the first test voltages.

5. The phase calibration method for a phased array antenna of claim 4, wherein the removing the environment vector from the first array vector, to obtain the calibration response vector of the antenna unit in the ith row and the jth column under the first test voltage, comprises:

when it is determined based on phase information of the microwave signal radiated by the antenna unit in the ith row and the jth column that a phase shift range of the antenna unit in the ith row and the jth column is between 359° and 360°, determining a sum of the first array vectors of the antenna unit in the ith row and the jth column under all the first test voltages;

determining the environment vector corresponding to the antenna unit in the ith row and the jth column based on the sum of the first array vectors and the number of the first array vectors; and removing the environment vector from the first array vector, to obtain the calibration response vector of the antenna unit in the ith row and the jth column under the first test voltage.

6. The phase calibration method for a phased array antenna of claim 4, wherein the removing the environment vector from the first array vector, to obtain the calibration response vector of the antenna unit in the ith row and the jth column under the first test voltage, comprises:

from the first array vectors of the antenna unit in the ith row and the jth column under all first test voltages, screening a plurality of pairs of second array vectors with a phase difference of 180° therebetween, based on phase information of the microwave signals radiated by the antenna unit in the ith row and the jth column;

determining a sum of the screened second array vectors;

determining the environment vector corresponding to the antenna unit in the ith row and the jth column based on the sum of the second array vectors and the number of the second array vectors; and removing the environment vector from the first array vector, to obtain the calibration response vector of the antenna unit in the ith row and the jth column under the first test voltage.

7. The phase calibration method for a phased array antenna of claim 4, wherein the removing the environment vector from the first array vector, to obtain the calibration response vector of the antenna unit in the ith row and the jth column under the first test voltage, comprises:

performing ellipse fitting on the first array vectors of the antenna unit in the ith row and the jth column under all first test voltages, to obtain the environment vector corresponding to the antenna unit in the ith row and the jth column; and removing the environment vector from the first array vector, to obtain the calibration response vector of the antenna unit in the ith row and the jth column under the first test voltage.

8. The phase calibration method for a phased array antenna of claim 1, wherein the calibration response vector comprises a horizontal polarization response vector and a vertical polarization response vector; the horizontal polarization response vector is used for representing horizontal polarization phase and amplitude information of the microwave signal radiated by the antenna unit in the ith row and the jth column under the first test voltage; the vertical polarization response vector is used for representing vertical polarization phase and amplitude information of the microwave signal radiated by the antenna unit in the ith row and the jth column under the first test voltage;

the determining the target voltage-phase curve corresponding to the antenna unit in the ith row and the jth column, comprises:

performing polarization synthesis on the horizontal polarization response vector and the vertical polarization response vector, to obtain a target response vector; wherein the target response vector is used for representing target phase and amplitude information of the microwave signal radiated by the antenna unit in the ith row and the jth column under the first test voltage; and determining the target voltage-phase curve corresponding to the antenna unit in the ith row and the jth column based on the first test voltages and target phase information of the microwave signals radiated by the antenna unit in the ith row and the jth column under the first test voltages.

9. A phase calibration apparatus for a phased array antenna, wherein the phase calibration apparatus for a phased array antenna is configured to perform the phase calibration method for a phased array antenna of claim 1; the phased array antenna comprises M×N antenna units arranged in an array, where one of M and N is a positive integer which is greater than or equal to 1, and the other one of M and N is a positive integer which is greater than or equal to 2;

the phase calibration apparatus for a phased array antenna is configured to sequentially calibrate the M×N antenna units based on a test voltage set, which is determined in advance; the test voltage set comprises a plurality of first test voltages;

the phase calibration apparatus for a phased array antenna comprises a detection sensor, a voltage supply apparatus, a vector analyzer and a controller;

the voltage supply apparatus is configured to sequentially load the plurality of first test voltages in the test voltage set to the antenna unit in the ith row and the jth column under control of the controller; where $0<i \le M$, $0<j \le N$, and i and j are positive integers;

the detection sensor is configured to acquire phase and amplitude information of a microwave signal radiated by the antenna unit in the ith row and the jth column every time one of the plurality of first test voltages is loaded to the antenna unit in the ith row and the jth column by the voltage supply apparatus, and transmit the phase and amplitude information to the vector analyzer;

the vector analyzer is configured to acquire a plurality of first array vectors through analysis based on the phase and amplitude information of the acquired microwave signals of the antenna unit in the ith row and the jth column under different first test voltages; and transmit the plurality of first array vectors to the controller; where each of the plurality of first array vectors is used for representing a sum of a plurality of response vectors of the M×N antenna units; each of the plurality of response vectors is used for representing the phase and amplitude information of the microwave signal radiated by a corresponding antenna unit under a corresponding first test voltage; and the controller is configured to obtain a calibration response vector of the antenna unit in the ith row and the jth column under each first test voltage in the test voltage set through a first preset algorithm based on the plurality of first array vectors, and determine a target voltage-phase curve corresponding to the antenna unit in the ith row and the jth column; wherein the calibration response vector is used for representing the calibrated phase and amplitude information of the microwave signal radiated by the antenna unit in the ith row and the jth column under the first test voltage.

10. A phase calibration system for a phased array antenna, wherein the phase calibration system for a phased array antenna comprises the phase calibration apparatus for a phased array antenna of claim 9, and the phased array antenna;

the phase calibration apparatus for a phased array antenna comprises the detection sensor, wherein a height of the detection sensor is within a height range of each antenna unit in the phased array antenna; a distance from the detection sensor to an orthographic projection of the detection sensor on the phased array antenna is in a range from $0.5\lambda$ to $1\lambda$; where $\lambda$ is a center frequency wavelength.

11. A phase calibration method for a phased array antenna, wherein the phased array antenna comprises M×N antenna units arranged in an array, where one of M and N is a positive integer which is greater than or equal to 1, and the other one M and N is a positive integer which is greater than or equal to 2; the phase calibration method comprises:

uniformly sampling a plurality of control voltages from a preset control voltage range to form a test voltage set comprising a plurality of first test voltages; wherein calibrating an antenna unit in an ith row and a jth column of the M×N antenna units comprises:

sequentially loading the plurality of first test voltages in the test voltage set to the antenna unit in the ith row and the jth column, and acquiring phase and amplitude information of a microwave signal radiated by the antenna unit in the ith row and the jth column every time one of the plurality of first test voltages is loaded; where $0<i\leq M$, $0<j\leq N$, and i and j are positive integers;

acquiring a plurality of first array vectors through analysis based on the acquired phase and amplitude information of the microwave signals of the antenna unit in the ith row and the jth column under different first test voltages, respectively; wherein each of the plurality of first array vectors is used for representing a sum of a plurality of response vectors of the M×N antenna units in the phased array antenna; each of the plurality of response vectors is used for representing the phase and amplitude information of the microwave signal radiated by a corresponding antenna unit under a corresponding first test voltage;

removing a first environment vector from each first array vector through a first preset algorithm, to obtain an initial response vector of the antenna unit in the ith row and the jth column under each first test voltage in the test voltage set, and determining an initial voltage-phase curve corresponding to the antenna unit in the ith row and the jth column; wherein the first environment vector is used for representing a sum of response vectors corresponding to other antenna units except the antenna unit in the ith row and the jth column in the phased array antenna; the initial response vector is used for representing initial phase and amplitude information of the microwave signal radiated by the antenna unit in the ith row and the jth column under the first test voltage;

updating the test voltage set according to the initial voltage-phase curve corresponding to the antenna unit in the ith row and the jth column and a second voltage screening condition, to obtain an updated test voltage set; and sequentially loading a plurality of second test voltages in the updated test voltage set to the antenna unit in the ith row and the jth column, and obtaining a target voltage-phase curve corresponding to the antenna unit in the ith row and the jth column.

12. The phase calibration method for a phased array antenna of claim 11, wherein the sequentially loading a plurality of second test voltages in the updated test voltage set to the antenna unit in the ith row and the jth column, to obtain a target voltage-phase curve corresponding to the antenna unit in the ith row and the jth column, comprises:

sequentially loading the second test voltages in the updated test voltage set to the antenna unit in the ith row and the jth column, and acquiring phase and amplitude information of the microwave signal radiated by the antenna unit in the ith row and the jth column every time one of the second test voltages is loaded;

acquiring the plurality of first array vectors through analysis based on the phase and amplitude information of the acquired microwave signals of the antenna unit in the ith row and the jth column under the different second test voltages, respectively;

extracting a second environment vector from each of the plurality of first array vectors through the first preset algorithm based on the first array vector; wherein the second environment vector is used for representing a sum of response vectors corresponding to other antenna units except the antenna unit in the ith row and the jth column in the phased array antenna;

obtaining a calibration response vector of the antenna unit in the ith row and the jth column under each first test voltage in the test voltage set through the first preset algorithm in a case where an error between the second environment vector and the first environment vector is smaller than a preset value; wherein the calibration response vector is used for representing the calibrated phase and amplitude information of the microwave signal radiated by the antenna unit in the ith row and the jth column under the first test voltage; and determining the target voltage-phase curve corresponding to the antenna unit in the ith row and the jth column based on all the second test voltages and calibrated phase information of the microwave signals radiated by the antenna unit in the ith row and the jth column under all the second test voltages.

13. The phase calibration method for a phased array antenna of claim 12, further comprising:

continuously updating the test voltage set based on the second environment vector if the error between the second environment vector and the first environment vector is greater than or equal to the preset value, until the error between the second environment vector and the first environment vector is less than the preset value.

14. The phase calibration method for a phased array antenna of claim 11, wherein the initial voltage-phase curve comprises at least a third line segment; a curvature of the third line segment is within a third preset curvature range;
the updating the test voltage set according to the initial voltage-phase curve corresponding to the antenna unit in the ith row and the jth column and a second voltage screening condition, to obtain the updated test voltage set, comprises:
acquiring a third control voltage sub-range corresponding to the third line segment; and
screening a third number of control voltages from the third control voltage sub-range as the second test voltages, and updating the test voltage set to obtain the updated test voltage set.

15. The phase calibration method for a phased array antenna of claim 11, wherein the removing a first environment vector from each first array vector through a first preset algorithm, to obtain an initial response vector of the antenna unit in the ith row and the jth column under each first test voltage in the test voltage set, comprises:
determining a sum of the first array vectors of the antenna unit in the ith row and the jth column under all the first test voltages in a case where it is determined, based on phase information of the microwave signals radiated by the antenna unit in the ith row and the jth column, that a phase shift range of the antenna unit in the ith row and the jth column is between 359° and 360°;
determining the first environment vector corresponding to the antenna unit in the ith row and the jth column based on the sum of the first array vectors and the number of the first array vectors; and
removing the first environment vector from each of the first array vectors, to obtain the initial response vector of the antenna unit in the ith row and the jth column under the first test voltage.

16. The phase calibration method for a phased array antenna of claim 11, wherein the removing a first environment vector from each first array vector through a first preset algorithm, to obtain an initial response vector of the antenna unit in the ith row and the jth column under each first test voltage in the test voltage set, comprises:
screening a plurality of pairs of second array vectors in which each pair of second array vectors have a phase difference of 180° therebetween, from the plurality of first array vectors of the antenna unit in the ith row and the jth column under all the first test voltages based on the phase information of the microwave signals radiated by the antenna unit in the ith row and the jth column;
determining a sum of the screened second array vectors;
determining the first environment vector corresponding to the antenna unit in the ith row and the jth column based on a sum of the second array vectors and the number of the second array vectors; and
removing the first environment vector from each of the first array vectors, to obtain the initial response vector of the antenna unit in the ith row and the jth column under the first test voltage.

17. The phase calibration method for a phased array antenna of claim 11, wherein the removing a first environment vector from each first array vector through a first preset algorithm, to obtain an initial response vector of the antenna unit in the ith row and the jth column under each first test voltage in the test voltage set, comprises:
performing an ellipse fitting on the plurality of first array vectors of the antenna unit in the ith row and the jth column under all the first test voltages, to obtain the first environment vector corresponding to the antenna unit in the ith row and the jth column; and
removing the first environment vector from each of the first array vectors, to obtain the initial response vector of the antenna unit in the ith row and the jth column under the first test voltage.

18. The phase calibration method for a phased array antenna of claim 11, wherein the calibration response vector comprises a horizontal polarization response vector and a vertical polarization response vector; the horizontal polarization response vector is used for representing horizontal polarization phase and amplitude information of the microwave signal radiated by the antenna unit in the ith row and the jth column under the second test voltage; the vertical polarization response vector is used for representing vertical polarization phase and amplitude information of the microwave signal radiated by the antenna unit in the ith row and the jth column under the second test voltage;
the obtaining a target voltage-phase curve corresponding to the antenna unit in the ith row and the jth column, comprises:
performing polarization synthesis on the horizontal polarization response vector and the vertical polarization response vector, to obtain a target response vector; wherein the target response vector is used for representing target phase and amplitude information of the microwave signal radiated by the antenna unit in the ith row and the jth column under the second test voltage; and
determining the target voltage-phase curve corresponding to the antenna unit in the ith row and the jth column based on the second test voltages and target phase information of the microwave signals radiated by the antenna unit in the ith row and the jth column under the second test voltages.

19. A phase calibration apparatus for a phased array antenna, wherein the phase calibration apparatus for a phased array antenna is configured to perform the phase calibration method for a phased array antenna of claim 11; the phased array antenna comprises M×N antenna units arranged in an array, where one of M and N is a positive integer which is greater than or equal to 1, and the other one of M and N is a positive integer which is greater than or equal to 2;
the phase calibration apparatus for a phased array antenna comprises a detection sensor, a voltage supply apparatus, a vector analyzer and a controller;
the controller is configured to uniformly sample a plurality of control voltages from a preset control voltage range to form the test voltage set; wherein the test voltage set comprises the plurality of first test voltages; and obtain an initial response vector of the antenna unit in the ith row and the jth column under each first test voltage in the test voltage set through a first preset algorithm based on the first array vector, and determine an initial voltage-phase curve corresponding to the antenna unit in the ith row and the jth column; wherein the initial response vector is used for representing initial phase and amplitude information of the microwave signal radiated by the antenna unit in the ith row and the jth column under the first test voltage; update the test voltage set according to the initial voltage-phase curve corresponding to the antenna unit in the ith row and the jth column and a second voltage screening condition, to obtain an updated test voltage set; and obtain a target voltage-phase curve corresponding to the antenna unit in the ith row and the jth column through a second preset algorithm;

the voltage supply apparatus is configured to sequentially load the plurality of first test voltages in the test voltage set to the antenna unit in the ith row and the jth column under control of the controller; where $0<i\leq M$, $0<j\leq N$, and i and j are positive integers; and sequentially load second test voltages in the updated test voltage set to the antenna unit in the ith row and the jth column under control of the controller;

the detection sensor is configured to acquire phase and amplitude information of a microwave signal radiated by the antenna unit in the ith row and the jth column every time one of the plurality of first test voltages is loaded to the antenna unit in the ith row and the jth column by the voltage supply apparatus, and transmit the phase and amplitude information to the vector analyzer; and the vector analyzer is configured to acquire a plurality of first array vectors through analysis based on the phase and amplitude information of the acquired microwave signals of the antenna unit in the ith row and the jth column under different first test voltages; where each first array vector is used for representing a sum of a plurality of response vectors of the M×N antenna units; each response vector is used for representing the phase and amplitude information of the microwave signal radiated by a corresponding antenna unit under a corresponding first test voltage.

20. A phase calibration system for a phased array antenna, wherein the phase calibration system for a phased array antenna comprises the phase calibration apparatus for a phased array antenna of claim 19, and the phased array antenna;

the phase calibration apparatus for a phased array antenna comprises the detection sensor, wherein a height of the detection sensor is within a height range of each antenna unit in the phased array antenna; a distance from the detection sensor to an orthographic projection of the detection sensor on the phased array antenna is in a range from $0.5\lambda$ to $1\lambda$; where $\lambda$ is a center frequency wavelength.

* * * * *